(12) United States Patent
Langsdorf et al.

(10) Patent No.: US 12,290,490 B2
(45) Date of Patent: May 6, 2025

(54) VIAL WITH OPTIMIZED NECK FOR IMPROVED SIDE COMPRESSION PERFORMANCE

(71) Applicant: SCHOTT PHARMA AG & CO. KGAA, Mainz (DE)

(72) Inventors: Andreas Langsdorf, Ingelheim (DE); Florian Maurer, Griesheim (DE); Peter Thomas, Koblenz (DE); Alexander Humbertjean, Bad Krozingen (DE); Tobias Wetzel, Sölden (DE); Hanspeter Kummer, Müllheim (DE)

(73) Assignee: SCHOTT PHARMA AG & CO. KGAA, Mainz (DE)

( * ) Notice: Subject to any disclaimer, the term of this patent is extended or adjusted under 35 U.S.C. 154(b) by 0 days.

(21) Appl. No.: 16/920,802

(22) Filed: Jul. 6, 2020

(65) Prior Publication Data
US 2021/0000690 A1 Jan. 7, 2021

(30) Foreign Application Priority Data
Jul. 4, 2019 (EP) ..................................... 19184541

(51) Int. Cl.
*A61J 1/14* (2023.01)
*C03C 17/00* (2006.01)
*C03C 17/30* (2006.01)

(52) U.S. Cl.
CPC ........... *A61J 1/1468* (2015.05); *A61J 1/1412* (2013.01); *C03C 17/005* (2013.01); *C03C 17/30* (2013.01)

(58) Field of Classification Search
None
See application file for complete search history.

(56) References Cited

U.S. PATENT DOCUMENTS 2,484,039 A * 10/1949 Krueger ................. B65D 41/16
215/321
3,207,590 A 9/1965 Corbeek
(Continued)

FOREIGN PATENT DOCUMENTS

DE 19622550 12/1997
JP H10157719 6/1998
(Continued)

OTHER PUBLICATIONS https://marijuanapackaging.com/collections/ (2023).*
(Continued)

*Primary Examiner* — John Vincent Lawler
(74) *Attorney, Agent, or Firm* — Ruggiero McAllister & McMahon LLC

(57) ABSTRACT

A glass container is provided having a glass tube with a first end and a second end and a glass bottom closing the second end. The glass tube has a longitudinal axis and has, in a direction from the first to the second end, a top region, a junction region, a neck region, a shoulder region, and a body region. The top region is at the first end and has an outer diameter ($d_t$), the neck region has an outer diameter ($d_n$) with $d_n<d_t$, the body region extends to the second end and has an outer diameter ($d_b$) with $d_b>d_t$, and the glass tube in the body region has a thickness ($l_b$). The outer contour in a transition area between the top and neck regions is defined by a radius of curvature. The glass containers have a neck squeeze test load of at least 1100 N.

22 Claims, 11 Drawing Sheets

(56) References Cited

U.S. PATENT DOCUMENTS

| | | | |
|---|---|---|---|
| 3,360,352 | A | 12/1967 | Sundstrom |
| 4,420,578 | A | 12/1983 | Hagens |
| 6,537,626 | B1 | 3/2003 | Spallek |
| 10,117,806 | B2 | 11/2018 | Chang |
| 11,787,735 | B2 | 10/2023 | Demartino |
| 2005/0118367 | A1 | 6/2005 | Gantenbrink |
| 2007/0202144 | A1 | 8/2007 | Hellerbrand |
| 2011/0006028 | A1 | 1/2011 | Caldwell |
| 2013/0171456 | A1 | 7/2013 | Fadeev |
| 2014/0034544 | A1* | 2/2014 | Chang .................... C03B 23/04 |
| | | | 428/34.4 |
| 2016/0145150 | A1 | 5/2016 | Bookbinder |
| 2017/0247287 | A1* | 8/2017 | DeMartino ......... C03C 23/0095 |
| 2017/0333938 | A1 | 11/2017 | Brennan |
| 2018/0116907 | A1* | 5/2018 | Fadeev .................... C03C 17/32 |
| 2018/0148222 | A1 | 5/2018 | Deutschle |
| 2018/0193228 | A1 | 7/2018 | David |
| 2018/0370665 | A1 | 12/2018 | Broadbent |
| 2019/0021949 | A1 | 1/2019 | Skufca |
| 2019/0161383 | A1* | 5/2019 | Deneka ............. C03B 33/085 |
| 2019/0329932 | A1 | 10/2019 | Iwata |
| 2020/0140327 | A1 | 5/2020 | Higginbottom |
| 2022/0017412 | A1 | 1/2022 | Demartino |
| 2023/0278745 | A1* | 9/2023 | Langsdorf ............. B65D 1/023 |
| | | | 215/40 |

FOREIGN PATENT DOCUMENTS

| | | | |
|---|---|---|---|
| JP | 2017527517 | 9/2017 | |
| JP | 2019005330 | 1/2019 | |
| WO | 8102572 | 9/1981 | |
| WO | 9119606 | 12/1991 | |
| WO | WO-2009104179 A2 * | 8/2009 | ............... F25C 1/22 |
| WO | 2014130349 | 8/2014 | |
| WO | 2014105350 | 10/2014 | |
| WO | 2016037083 | 3/2016 | |
| WO | 2019004008 | 1/2019 | |
| WO | 2019108803 | 6/2019 | |

OTHER PUBLICATIONS

ISO for vials—IDS—2011 (Year: 2011).*
Section 3.2.1 of the European Pharmacopoeia, 7th edition from 2011, 7 pages.
DIN EN ISO 8362-1:2016-06, 15 pages.
ISO 12775, 14 pages.
ISO 7884-6:1987, 8 pages.
DIN EN ISO 8113, "Glass containers—Resistance to vertical load—Test methods", 6 pages.
ISO 8362-4, "Injection containers and accessories—Part 4: Injection vials made of moulded glass", Third Edition, Sep. 1, 2011, 12 pages.

* cited by examiner

VIAL WITH OPTIMIZED NECK FOR IMPROVED SIDE COMPRESSION PERFORMANCE

CROSS REFERENCE TO RELATED APPLICATIONS

This application claims benefit under 35 USC § 119(a) of European Application 19184541.1 filed Jul. 4, 2019, the entire contents of which are incorporated herein by reference.

BACKGROUND

Field of the Invention

The present invention relates to a glass container comprising as container parts i) a glass tube with a first end and a further end, wherein the glass tube is characterized by a longitudinal axis $L_{tube}$ and comprises, in a direction from the top to the bottom, ia) a top region that is located at the first end of the glass tube, ib) a junction region that follows the top region, ic) a neck region that follows the junction region, id) a shoulder region that follows the neck region and ie) a body region that follows the shoulder region and that extends to the further end of the glass tube, and ii) a glass bottom that closes the glass tube at the further end.

Further, the invention relates to a plurality of glass containers, to a process for the preparation of a glass container, to a glass container obtainable by this process, to a process for the preparation of a closed glass container, to a closed glass container obtainable by this process and to the use of a glass container for packaging a pharmaceutical composition.

In the pharmaceutical industry, containers are used for the primary packaging of drugs. Among the traditionally most used materials is a glass container, as it ensures stability, visibility, endurance, rigidity, moisture resistance, ease of capping, and economy. The glass containers for medicinal purposes currently on the market include glass containers, made from glass tubing and blow-molded glass containers. The manufacturing methods for tubing-based glass containers and blow-molded glass containers are widely known. Tubing based glass containers are made from prefabricated glass tubing (mother tube) by shaping and separation. In a typical manufacturing process, a glass tube is loaded into the head of a rotary machine, and then, while rotating around its major axis, one end of a glass tube is heated to the softening point of the glass for the formation of a top region, a neck region and a shoulder that both characterize the final form at the top of the glass container. After the top region has been formed, the glass tube is again heated to its softening point at a well-defined position above the thus formed top region and is then pulled along its major axis for stretching and spreading the portion that has been subjected to heat softening to create and shape the bottom of the desired container. Blow-molded glass containers are made by shaping a glass melt directly by blowing or press-and-blow processes. The blow-molded glass containers include, for example, spray and infusion bottles, such as those described in DE 196 22 550 A1. However, blow-molded glass containers do typically have much higher tolerances in the wall thickness including local sections with higher and lower wall thicknesses. Due to refraction of light they are typically not suitable for optical inspection of a filled container through the glass wall, what renders them unsuitable for many pharmaceutical applications.

Glass vials that are intended for pharmaceutical packaging must pass numerous mechanical tests. High axial loads that are determined in a so called "vertical compression test" may, for example, be required if glass vials are used in automated sampling machines in scientific labs or medical institutions as well as during stoppering, shipping, and storage of glass vials. In addition to a certain resistance to axial loads glass containers should also display sufficiently high burst strength as determined in the so-called "burst pressure test". Burst pressure testing is, for example, appropriate if pharmaceutical preparations, after they have been filled in a glass container, are subjected to lyophilisation in order to find the weakest point on the interior or exterior surface of a container.

A further mechanical test that is often used to determine the mechanical strength of a glass vial is the so called "side compression test". This test is used, for example, to determine the impact that a certain back pressure may have on the glass vials during transport in a depyrogenation tunnel or generally during transport on a filling line. In this test the glass vials are positioned between an upper and a lower portion of a test tool as shown in FIG. 1, wherein a defined load is applied directly onto the body region of the glass vial.

As the use of glass vials in pharmaceutical industry only allows a very low failure probability upon application of mechanical stress, glass vials intended for the filling of pharmaceutical preparations should therefore be characterized by sufficiently high strength, particularly by a sufficiently high ability to withstand a certain pressure in the above described side compression test. Although ISO-vials are already adapted to these increased stability requirements, the strength of glass vials can be further improved. For example, to increase the strength of glass containers the glass surface of the containers can be hardened, for example by means of chemical treatments as disclosed in WO 1981/002572 A1 or in EP 0 495 936 A1. However, such a hardening process requires an additional process step in the manufacturing of glass containers and—in case of chemical treatments—also leads to a modification of the glass surface. Therefore, a chemically strengthened glass surface typically requires a new approval of the glass container.

SUMMARY

In general, it is an object of the present invention to at least partly overcome a disadvantage arising from the prior art. It is a further object of the invention to provide a glass container, preferably a glass vial, for pharmaceutical packaging which has an improved strength in a side compression test in which a certain load is directly applied onto the body portion of the glass container, particularly compared to the ISO-vials known from the prior art. It is a further object of the invention to provide a glass container, preferably a glass vial, for pharmaceutical packaging which has an improved strength in a side compression test in which a certain load is directly applied onto the body portion of the glass container, particularly compared to the ISO-vials known from the prior art, and which has been prepared by a process as simple as possible, preferably from prefabricated glass tubes by shaping and separation. It is a further object of the invention to provide a process for the preparation of a glass container, preferably a glass vial, for pharmaceutical packaging which has an improved strength in a side compression test in which a certain load is directly applied onto the body portion of the glass container, particularly compared to the ISO-vials known from the prior art, from prefabricated glass tubes by shaping and separation, wherein no additional process steps such as a modification of the glass surface is required.

A contribution to at least partly solving at least one, preferably more than one, of the above objects is made by the preferred embodiments disclosed herein.

A contribution to solving at least one of the objects according to the invention is made by an embodiment 1 of a glass container 1 comprising as container parts: a glass tube with a first end and a further end, wherein the glass tube is characterized by a longitudinal axis $L_{tube}$ and comprises, in a direction from the top to the bottom: ia) a top region that is located at the first end of the glass tube, wherein the outer diameter of the top region is $d_t$; ib) a junction region that follows the top region; ic) a neck region that follows the junction region, wherein the outer diameter of the neck region is $d_n$ with $d_n < d_t$ and wherein the minimum thickness of the glass in the neck region is $l_n$; id) a shoulder region that follows the neck region; and ie) a body region that follows the shoulder region and that extends to the further end of the glass tube, wherein the thickness of the glass in the body region is $l_b$ and wherein the outer diameter of the body region is $d_b$ with $d_b > d_t$; ii) a glass bottom that closes the glass tube at the further end; wherein the junction region has an outer surface that at the end at which the junction region merges into the neck region is substantially circular arc-shaped, the substantially circular arc-shaped area having an outer radius $r_s$, and wherein the following condition is fulfilled: $2 \times [l_n/l_b] \times r_s \geq 0.9$ mm; preferably $2 \times [l_n/l_b] \times r_s \geq 1.0$ mm; more preferably $2 \times [l_n/l_b] \times r_s \geq 1.1$ mm; even more preferably $2 \times [l_n/l_b] \times r_s \geq 1.2$ mm; even more preferably $2 \times [l_n/l_b] \times r_s \geq 1.3$ mm; even more preferably $2 \times [l_n/l_b] \times r_s \geq 1.4$ mm; even most preferably $2 \times [l_n/l_b] \times r_s \geq 1.5$ mm; even more preferably $2 \times [l_n/l_b] \times r_s \geq 1.7$ mm; even more preferably $2 \times [l_n/l_b] \times r_s \geq 2.0$ mm; most preferably $2 \times [l_n/l_b] \times r_s \geq 2.5$ mm.

A contribution to solving at least one of the objects according to the invention is also made by an embodiment 1 of a plurality 1 of glass containers, each glass container comprising as container parts: a glass tube with a first end and a further end, wherein the glass tube is characterized by a longitudinal axis $L_{tube}$ and comprises, in a direction from the top to the bottom: ia) a top region that is located at the first end of the glass tube, wherein the outer diameter of the top region is $d_t$; ib) a junction region that follows the top region; ic) a neck region that follows the junction region, wherein the outer diameter of the neck region is $d_n$ with $d_n < d_t$; id) a shoulder region that follows the neck region; and ie) a body region that follows the shoulder region and that extends to the further end of the glass tube, wherein the thickness of the glass in the body region is $l_b$ and wherein the outer diameter of the body region is $d_b$ with $d_b > d_t$; a glass bottom that closes the glass tube at the further end; wherein the load under which 50% of the glass containers (100) contained in the plurality of glass containers (100) break in the neck squeeze test as described herein is at least 1100 N, preferably at least 1200 N, more preferably at least 1300 N, even more preferably at least 1400 N, even more preferably at least 1500 N, even more preferably at least 1600 N, even more preferably at least 1800 N, even more preferably at least 2000 N, even more preferably at least 2500 N and most preferably at least 3000 N.

In an embodiment 2 of a plurality 1 of glass containers the plurality 1 is designed according to its embodiment 1, wherein ib) the junction region has an outer surface that at the end at which the junction region merges into the neck region is substantially circular arc-shaped, the substantially circular arc-shaped area having an outer radius $r_s$; ic) the minimum thickness of the glass in the neck region is $l_n$; and wherein for at least 75%, preferably for at least 85%, more preferably for at least 95% and most preferably for each of the glass containers contained in the plurality 1 of glass containers the following condition is fulfilled: $2 \times [l_n/l_b] \times r_s \geq 0.9$ mm; preferably $2 \times [l_n/l_b] \times r_s \geq 1.0$ mm; more preferably $2 \times [l_n/l_b] \times r_s \geq 1.1$ mm; even more preferably $2 \times [l_n/l_b] \times r_s \geq 1.2$ mm; even more preferably $2 \times [l_n/l_b] \times r_s \geq 1.3$ mm; even more preferably $2 \times [l_n/l_b] \times r_s \geq 1.4$ mm; even most preferably $2 \times [l_n/l_b] \times r_s \geq 1.5$ mm; even more preferably $2 \times [l_n/l_b] \times r_s \geq 1.7$ mm; even more preferably $2 \times [l_n/l_b] \times r_s \geq 2.0$ mm; most preferably $2 \times [l_n/l_b] \times r_s \geq 2.5$ mm.

"A plurality of glass containers" in the sense of the present invention preferably comprises at least 10 glass containers, preferably at least 25 glass containers, more preferably at least 50 glass containers, even more preferably at least 75 glass containers and most preferably at least 100 glass containers. Furthermore, the plurality of glass containers preferably has been collected arbitrarily and particularly has not been selected with regard to any property. For example, the plurality of glass containers may be the Group of containers which are packed together in a typical transport tray.

Surprisingly, it has been observed that the mechanical strength of a glass container in a side compression test known from the prior art, i. e. in a static load test in which a load is directly applied only onto the body region of the glass container, can be significantly improved by controlling the outer contour of the glass container in the area that comprises the junction region and the neck region, i. e. in an area which—as shown in FIG. 1—in the side compression test known from the prior art is not in contact with the upper and the lower portion of a test tool that is used to apply the desired load. It also has been observed that glass containers which pass the neck side compression test as described herein are also characterized by an improved mechanical strength in the side compression test known from the prior art. This is again surprising as in the side compression test known from the prior art a load is directly applied only onto the body region of the glass container, but not to the neck region. A person skilled in the art could therefore not expect that an improvement of the mechanical strength in the neck region towards laterally applied loads will also improve the mechanical strength with regards to loads in the body region.

In an embodiment 2 of the glass container 1 according to the invention or in an embodiment 3 of the plurality 1 of glass containers according to the invention, the glass container 1 is designed according to its embodiment 1 or the plurality 1 of glass containers is designed according to its embodiment 1 or 2, wherein for the glass container 1 or for at least 75%, preferably for at least 85%, more preferably for at least 95% and most preferably for each glass container contained in the plurality 1 of glass containers the following conditions are fulfilled if the glass container is placed on a plane horizontal substrate with the outer surface of the body region on it, within any given cross-section of the glass container that is located in a plane being centrically located in the glass container and comprising the longitudinal axis $L_{tube}$ of the glass tube, f(x) defines the vertical distance between the substrate and the outer surface of the glass container at a given position x and l(x) defines the thickness of the glass at a given position x, wherein the thickness of the glass l(x) is measured in a direction perpendicular to longitudinal axis $L_{tube}$;

$k(x) = |f''(x)/[1+f'(x)^2]^{3/2}|$ defines the absolute value of the curvature of f(x) at a given position x; and in the interval between $x=P_1$ and $x=P_2$ for any concave curvature in this interval the minimum value for $[l(x)/l_b]^3/k(x)$ is at least 0.35 mm, preferably at least 0.5 mm, more preferably at least 0.7 mm, even more preferably at least 0.9 mm, even more preferably at least 1.1 mm, even more preferably at least 1.3 mm, even more preferably at least 1.5 mm, even more preferably at least 1.7 mm, even more preferably at least 2.0 mm and most preferably at least 2.5 mm, wherein $P_2$ defines the x-position at which $f(x)$ is $\frac{1}{2} \times d_b - \frac{1}{4} \times d_t - \frac{1}{4} \times d_n$ and $P_1$ is $P_2 - d_t/2 + d_n/2$.

In an embodiment 3 of the glass container 1 according to the invention or in an embodiment 4 of the plurality 1 of glass containers according to the invention, the glass container 1 is designed according to its embodiment 1 or 2 or the plurality 1 of glass containers is designed according to anyone of its embodiments 1 to 3, wherein the minimum thickness of the glass in the neck region is 1 and wherein for the glass container 1 or for at least 75%, preferably for at least 85%, more preferably for at least 95% and most preferably for each glass container contained in the plurality 1 of glass containers the following condition is fulfilled: $l_n/l_b \geq 1.3$; preferably $l_n/l_b \geq 1.4$; more preferably $l_n/l_b \geq 1.45$; even more preferably $l_n/l_b \geq 1.5$; most preferably $l_n/l_b \geq 1.6$.

In an embodiment 4 of the glass container 1 according to the invention or in an embodiment 5 of the plurality 1 of glass containers according to the invention, the glass container 1 is designed according to anyone of its embodiments 1 to 3 or the plurality 1 of glass containers is designed according to anyone of its embodiments 1 to 4, wherein for the glass container 1 or for at least 75%, preferably for at least 85%, more preferably for at least 95% and most preferably for each glass container contained in the plurality 1 of glass containers $d_t$ is in the range from 12 to 14 mm, preferably in the range from 12.5 to 13.5 mm and more preferably in the range from 12.7 to 13.2 mm or $d_t$ is in the range from 19 to 21 mm, preferably in the range from 19.5 to 20.5 mm and more preferably in the range from 19.7 to 20.2 mm.

In an embodiment 5 of the glass container 1 according to the invention or in an embodiment 6 of the plurality 1 of glass containers according to the invention, the glass container 1 is designed according to anyone of its embodiments 1 to 4 or the plurality 1 of glass containers is designed according to anyone of its embodiments 1 to 5, wherein for the glass container 1 or for at least 75%, preferably for at least 85%, more preferably for at least 95% and most preferably for each glass container contained in the plurality 1 of glass containers one of the following conditions are fulfilled: the filling volume is in the range from 1 ml to 8 ml and $d_n$ is in the range from 9 to 12 mm, preferably in the range from 9.5 to 10.5 mm, more preferably in the range from 9.7 to 10.3 mm, even more preferably in the range from 9.8 to 10.3 mm and most preferably in the range from 9.9 to 10.3 mm; the filling volume is in the range from 8.5 ml to 22 ml and $d_n$ is in the range from 14.5 to 18 mm, preferably in the range from 15.2 to 16.5 mm, more preferably in the range from 15.5 to 16.3 mm, even more preferably in the range from 15.7 to 16.3 mm and most preferably in the range from 15.9 to 16.3 mm; or the filling volume is in the range from 22.5 ml to 150 ml and $d_n$ is in the range from 15.0 to 20 mm, preferably in the range from 16.0 to 17.5 mm, more preferably in the range from 16.5 to 17.3 mm, even more preferably in the range from 16.7 to 17.3 mm and most preferably in the range from 16.9 to 17.3 mm.

In an embodiment 6 of the glass container 1 according to the invention or in an embodiment 7 of the plurality 1 of glass containers according to the invention, the glass container 1 is designed according to anyone of its embodiments 1 to 5 or the plurality 1 of glass containers is designed according to anyone of its embodiments 1 to 6, wherein for the glass container 1 or for at least 75%, preferably for at least 85%, more preferably for at least 95% and most preferably for each glass container contained in the plurality 1 of glass containers $d_b$ is in the range from 14 to 60 mm, preferably in the range from 15 to 32 mm, more preferably in the range from 15 to 25 mm, even more preferably in the range from 15 to 23 mm and most preferably in the range from 15 to 17 mm.

In an embodiment 7 of the glass container 1 according to the invention or in an embodiment 8 of the plurality 1 of glass containers according to the invention, the glass container 1 is designed according to anyone of its embodiments 1 to 6 or the plurality 1 of glass containers is designed according to anyone of its embodiments 1 to 7, wherein for the glass container 1 or for at least 75%, preferably for at least 85%, more preferably for at least 95% and most preferably for each glass container contained in the plurality 1 of glass containers $d_t - d_n$ is in the range from 1.5 to 6 mm, preferably in the range from 2 to 5 mm, more preferably in the range from 2.5 to 4.5 mm, even more preferably in the range from 2.5 to 4 mm and most preferably in the range from 2.5 to 3.5 mm.

In an embodiment 8 of the glass container 1 according to the invention or in an embodiment 9 of the plurality 1 of glass containers according to the invention, the glass container 1 is designed according to anyone of its embodiments 1 to 7 or the plurality 1 of glass containers is designed according to anyone of its embodiments 1 to 8, wherein for the glass container 1 or for at least 75%, preferably for at least 85%, more preferably for at least 95% and most preferably for each glass container contained in the plurality 1 of glass containers $d_b - d_n$ is in the range from 4 to 35 mm, preferably in the range from 4 to 15 mm, more preferably in the range from 5 to 13 mm, even more preferably in the range from 5 to 8 mm and most preferably in the range from 5 to 6 mm.

In an embodiment 9 of the glass container 1 according to the invention or in an embodiment 10 of the plurality 1 of glass containers according to the invention, the glass container 1 is designed according to anyone of its embodiments 1 to 8 or the plurality 1 of glass containers is designed according to anyone of its embodiments 1 to 9, wherein the shoulder in the shoulder region is characterized by a shoulder angle $\alpha$ and wherein for the glass container 1 or for at least 75%, preferably for at least 85%, more preferably for at least 95% and most preferably for each glass container contained in the plurality 1 of glass containers $\alpha$ is in the range from 10 to 70°, preferably in the range from 25 to 60°, more preferably in the range from 33 to 55°, even more preferably in the range from 37 to 50° and most preferably in the range from 38° to 45°.

In an embodiment 10 of the glass container 1 according to the invention or in an embodiment 11 of the plurality 1 of glass containers according to the invention, the glass container 1 is designed according to anyone of its embodiments 1 to 9 or the plurality 1 of glass containers is designed according to anyone of its embodiments 1 to 10, wherein the glass container 1 or at least 75%, preferably at least 85%, more preferably at least 95% and most preferably each glass container contained in the plurality 1 of glass containers in the container part from the glass bottom up to the top region is rotation-symmetric around the longitudinal axis that goes perpendicular through the centre of the glass bottom.

In an embodiment 11 of the glass container 1 according to the invention or in an embodiment 12 of the plurality 1 of glass containers according to the invention, the glass container 1 is designed according to anyone of its embodiments 1 to 10 or the plurality 1 of glass containers is designed according to anyone of its embodiments 1 to 11, wherein for the glass container 1 or for at least 75%, preferably for at least 85%, more preferably for at least 95% and most preferably for each glass container contained in the plurality 1 of glass containers throughout the body region the wall thickness $n_b$ of the glass tube is in a range from ±0.2 mm, preferably ±0.1 mm, more preferably ±0.08 mm and most preferably ±0.05 mm, in each case based on a mean value of this wall thickness in the body region.

In an embodiment 12 of the glass container 1 according to the invention or in an embodiment 13 of the plurality 1 of glass containers according to the invention, the glass container 1 is designed according to anyone of its embodiments 1 to 11 or the plurality 1 of glass containers is designed according to anyone of its embodiments 1 to 12, wherein the glass container has a mass of glass $m_g$ and an interior volume $V_i$ and wherein for the glass container 1 or for at least 75%, preferably for at least 85%, more preferably for at least 95% and most preferably for each glass container contained in the plurality 1 of glass containers the following condition is fulfilled: $m_g/V_i^{0.75}<2.0$; preferably $m_g/V_i^{0.75}<1.75$.

In an embodiment 13 of the glass container 1 according to the invention or in an embodiment 14 of the plurality 1 of glass containers according to the invention, the glass container 1 is designed according to anyone of its embodiments 1 to 12 or the plurality 1 of glass containers is designed according to anyone of its embodiments 1 to 13, wherein the glass container has an interior volume $V_i$ and wherein for the glass container 1 or for at least 75%, preferably for at least 85%, more preferably for at least 95% and most preferably for each glass container contained in the plurality 1 of glass containers $V_i$ in a range from 2 to 150 ml, preferably from 3 to 100 ml, more preferably from 3 to 50 ml, even more preferably from 3 to 15 ml, most preferably from 3 to 7 ml.

In an embodiment 14 of the glass container 1 according to the invention or in an embodiment 15 of the plurality 1 of glass containers according to the invention, the glass container 1 is designed according to anyone of its embodiments 1 to 13 or the plurality 1 of glass containers is designed according to anyone of its embodiments 1 to 14, wherein the glass container has a height $h_c$ and wherein for the glass container 1 or for at least 75%, preferably for at least 85%, more preferably for at least 95% and most preferably for each glass container contained in the plurality 1 of glass containers $h_c$ in the range from 15 to 100 mm, preferably in the range from 20 to 60 mm, more preferably in the range from 25 to 55 mm, even more preferably in the range from 30 to 50 mm and most preferably in the range from 34 to 46 mm.

In an embodiment 15 of the glass container 1 according to the invention or in an embodiment 16 of the plurality 1 of glass containers according to the invention, the glass container 1 is designed according to anyone of its embodiments 1 to 14 or the plurality 1 of glass containers is designed according to anyone of its embodiments 1 to 15, wherein the glass container 1 or at least 75%, preferably at least 85%, more preferably at least 95% and most preferably each glass container contained in the plurality 1 of glass containers is/are a packaging container for a medical or a pharmaceutical packaging good or both. A preferred pharmaceutical packaging good is a pharmaceutical composition. Preferably, the glass container 1 or the glass containers contained in the plurality 1 of glass containers is/are suitable for packaging parenteralia in accordance with section 3.2.1 of the European Pharmacopoeia, 7th edition from 2011.

In an embodiment 16 of the glass container 1 according to the invention or in an embodiment 17 of the plurality 1 of glass containers according to the invention, the glass container 1 is designed according to anyone of its embodiments 1 to 15 or the plurality 1 of glass containers is designed according to anyone of its embodiments 1 to 16, wherein the glass container 1 or at least 75%, preferably at least 85%, more preferably at least 95% and most preferably each glass container contained in the plurality 1 of glass containers is/are a vial.

In an embodiment 17 of the glass container 1 according to the invention or in an embodiment 18 of the plurality 1 of glass containers according to the invention, the glass container 1 is designed according to anyone of its embodiment 1 to 16 or the plurality 1 of glass containers is designed according to anyone of its embodiments 2 to 17, wherein the glass container 1 or at least 75%, preferably at least 85%, more preferably at least 95% and most preferably each glass container contained in the plurality 1 of glass containers is/are a vial with an interior volume of 1 to 8 ml and wherein the following conditions are fulfilled: $d_n \geq 9.5$ mm; $r_s \geq 0.5$ mm.

In an embodiment 18 of the glass container 1 according to the invention or in an embodiment 19 of the plurality 1 of glass containers according to the invention, the glass container 1 is designed according to its embodiment 17 or the plurality 1 of glass containers is designed according to its embodiment 18, wherein for the glass container 1 or for at least 75%, preferably for at least 85%, more preferably for at least 95% and most preferably for each glass container contained in the plurality 1 of glass containers the following condition is fulfilled: $d_n \geq 9.5$ mm; preferably $d_n \geq 9.6$ mm; more preferably $d_n \geq 9.7$ mm; even more preferably $d_n \geq 9.8$ mm; most preferably $d_n \geq 9.9$ mm.

In an embodiment 19 of the glass container 1 according to the invention or in an embodiment 20 of the plurality 1 of glass containers according to the invention, the glass container 1 is designed according to its embodiments 17 or 18 or the plurality 1 of glass containers is designed according to its embodiments 18 or 19, wherein for the glass container 1 or for at least 75%, preferably for at least 85%, more preferably for at least 95% and most preferably for each glass container contained in the plurality 1 of glass containers the following condition is fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 20 of the glass container 1 according to the invention or in an embodiment 21 of the plurality 1 of glass containers according to the invention, the glass container 1 is designed according to anyone of its embodiments 17 to 19 or the plurality 1 of glass containers is designed according to anyone of its embodiments 18 to 20, wherein the glass container 1 or at least 75%, preferably at least 85%, more preferably at least 95% and most preferably each glass container contained in the plurality 1 of glass containers is/are a vial with a size designation "2R" or "4R" according to DIN EN ISO 8362-1:2016-06.

In an embodiment 21 of the glass container 1 according to the invention or in an embodiment 22 of the plurality 1 of glass containers according to the invention, the glass container 1 is designed according to anyone of its embodiment 1 to 16 or the plurality 1 of glass containers is designed according to anyone of its embodiments 2 to 17, wherein the glass container 1 or at least 75%, preferably at least 85%, more preferably at least 95% and most preferably each glass container contained in the plurality 1 of glass containers is/are a vial with an interior volume of 8.5 to 22 ml and wherein the following conditions are fulfilled: $d_n \geq 15.5$ mm; $r_s \geq 0.5$ mm.

In an embodiment 22 of the glass container 1 according to the invention or in an embodiment 23 of the plurality 1 of glass containers according to the invention, the glass container 1 is designed according to its embodiment 21 or the plurality 1 of glass containers is designed according to its embodiment 22, wherein for the glass container 1 or for at least 75%, preferably for at least 85%, more preferably for at least 95% and most preferably for each glass container contained in the plurality 1 of glass containers the following condition is fulfilled: $d_n \geq 15.5$ mm; preferably $d_n \geq 15.6$ mm; more preferably $d_n \geq 15.7$ mm; even more preferably $d_n \geq 15.8$ mm; most preferably $d_n \geq 15.9$ mm.

In an embodiment 23 of the glass container 1 according to the invention or in an embodiment 24 of the plurality 1 of glass containers according to the invention, the glass container 1 is designed according to its embodiments 21 or 22 or the plurality 1 of glass containers is designed according to its embodiments 22 or 23, wherein for the glass container 1 or for at least 75%, preferably for at least 85%, more preferably for at least 95% and most preferably for each glass container contained in the plurality 1 of glass containers the following condition is fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 24 of the glass container 1 according to the invention or in an embodiment 25 of the plurality 1 of glass containers according to the invention, the glass container 1 is designed according to anyone of its embodiments 21 to 23 or the plurality 1 of glass containers is designed according to anyone of its embodiments 22 to 24, wherein the glass container 1 or at least 75%, preferably at least 85%, more preferably at least 95% and most preferably each glass container contained in the plurality 1 of glass containers is/are a vial with a size designation "6R", "8R" or "10R" according to DIN EN ISO 8362-1:2016-06.

In an embodiment 25 of the glass container 1 according to the invention or in an embodiment 26 of the plurality 1 of glass containers according to the invention, the glass container 1 is designed according to anyone of its embodiment 1 to 16 or the plurality 1 of glass containers is designed according to anyone of its embodiments 2 to 17, wherein the glass container 1 or at least 75%, preferably at least 85%, more preferably at least 95% and most preferably each glass container contained in the plurality 1 of glass containers is/are a vial with an interior volume of 22.5 to 150 ml and wherein the following conditions are fulfilled: $d_n \geq 16.5$ mm; $r_s \geq 0.5$ mm.

In an embodiment 26 of the glass container 1 according to the invention or in an embodiment 27 of the plurality 1 of glass containers according to the invention, the glass container 1 is designed according to its embodiment 25 or the plurality 1 of glass containers is designed according to its embodiment 26, wherein for the glass container 1 or for at least 75%, preferably for at least 85%, more preferably for at least 95% and most preferably for each glass container contained in the plurality 1 of glass containers the following condition is fulfilled: $d_n \geq 16.5$ mm; preferably $d_n \geq 16.6$ mm; more preferably $d_n \geq 16.7$ mm; even more preferably $d_n \geq 16.8$ mm; most preferably $d_n \geq 16.9$ mm.

In an embodiment 27 of the glass container 1 according to the invention or in an embodiment 28 of the plurality 1 of glass containers according to the invention, the glass container 1 is designed according to its embodiments 25 or 26 or the plurality 1 of glass containers is designed according to its embodiments 26 or 27, wherein for the glass container 1 or for at least 75%, preferably for at least 85%, more preferably for at least 95% and most preferably for each glass container contained in the plurality 1 of glass containers the following condition is fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 28 of the glass container 1 according to the invention or in an embodiment 29 of the plurality 1 of glass containers according to the invention, the glass container 1 is designed according to anyone of its embodiments 25 to 27 or the plurality 1 of glass containers is designed according to anyone of its embodiments 26 to 28, wherein the glass container 1 or at least 75%, preferably at least 85%, more preferably at least 95% and most preferably each glass container contained in the plurality 1 of glass containers is/are a vial with a size designation "20R", "25R", "30R", "50R" or "100R" according to DIN EN ISO 8362-1:2016-06.

In an embodiment 29 of the glass container 1 according to the invention or in an embodiment 30 of the plurality 1 of glass containers according to the invention, the glass container 1 is designed according to anyone of its embodiments 1 to 28 or the plurality 1 of glass containers is designed according to anyone of its embodiments 1 to 29, wherein the glass is of a type selected from the group consisting of a borosilicate glass, an aluminosilicate glass, soda lime glass and fused silica. "Soda lime glass" according to the invention is an alkaline/alkaline earth/silicate glass according to TABLE 1 of ISO 12775 ($1^{st}$ edition 1997 Oct. 15).

In an embodiment 30 of the glass container 1 according to the invention or in an embodiment 31 of the plurality 1 of glass containers according to the invention, the glass container 1 is designed according to anyone of its embodiments 1 to 29 or the plurality 1 of glass containers is designed according to anyone of its embodiments 1 to 30, wherein the glass container comprises a coating that at least partially superimposes the exterior surface, the interior surface or the exterior and the interior surface of the glass tube.

In an embodiment 31 of the glass container 1 according to the invention or in an embodiment 32 of the plurality 1 of glass containers according to the invention, the glass container 1 is designed according to its embodiment 30 or the plurality 1 of glass containers is designed according to its embodiment 31, wherein the coating comprises a silicone, a silane or a mixture thereof, wherein the silicone or the silane can be crosslinked or non-crosslinked. Suitable silanes and silicones for treating the surface of glass containers are, for examples, disclosed in US 2011/0006028 A1, U.S. Pat. No. 4,420,578 or in WO 2014/105350 A3.

In an embodiment 32 of the glass container 1 according to the invention or in an embodiment 33 of the plurality 1 of glass containers according to the invention, the glass container 1 is designed according to its embodiment 30 or the plurality 1 of glass containers is designed according to its embodiment 31, wherein the coating preferably comprises a coupling agent layer positioned on the exterior surface (i. e. the surface opposite to the interior surface that directed to the interior volume $V_i$ of the glass container) of the glass tube, the coupling agent layer comprising a coupling agent; and a polymer layer positioned over the coupling agent layer, the polymer layer comprising a polymer chemical composition. Preferably, the coating is a coating as described in US 2013/171456 A1.

In an embodiment 33 of the glass container 1 according to the invention or in an embodiment 34 of the plurality 1 of glass containers according to the invention, the glass container 1 is designed according to its embodiment 32 or the plurality 1 of glass containers is designed according to its embodiment 33, wherein the coating further comprises an interface layer positioned between the coupling agent layer and the polymer layer and the interface layer comprises one or more chemical compositions of the polymer layer bound with one or more of the chemical compositions of the coupling agent layer.

In an embodiment 34 of the glass container 1 according to the invention or in an embodiment 35 of the plurality 1 of glass containers according to the invention, the glass container 1 is designed according to its embodiment 32 or 33 or the plurality 1 of glass containers is designed according to its embodiment 33 or 34, wherein the coupling agent comprises at least one of: a first silane chemical composition, a hydrolysate thereof, or an oligomer thereof; and a chemical composition formed from the oligomerization of at least the first silane chemical composition and a second silane chemical composition, wherein the first silane chemical composition and the second silane chemical composition are different chemical compositions.

In an embodiment 35 of the glass container 1 according to the invention or in an embodiment 36 of the plurality 1 of glass containers according to the invention, the glass container 1 is designed according to its embodiment 34 or the plurality 1 of glass containers is designed according to its embodiment 35, wherein the first silane chemical composition is an aromatic silane chemical composition.

In an embodiment 36 of the glass container 1 according to the invention or in an embodiment 37 of the plurality 1 of glass containers according to the invention, the glass container 1 is designed according to its embodiment 32 or the plurality 1 of glass containers is designed according to its embodiment 33, wherein the coupling agent comprises a silsesquioxane chemical composition comprising an aromatic moiety and an amine moiety.

In an embodiment 37 of the glass container 1 according to the invention or in an embodiment 38 of the plurality 1 of glass containers according to the invention, the glass container 1 is designed according to its embodiment 32 or the plurality 1 of glass containers is designed according to its embodiment 33, wherein the coupling agent comprises at least one of: a mixture of a first silane chemical composition and a second silane chemical composition; and a chemical composition formed from the oligomerization of at least the first silane chemical composition and the second silane chemical composition, wherein the first silane chemical composition and the second silane chemical composition are different chemical compositions.

In an embodiment 38 of the glass container 1 according to the invention or in an embodiment 39 of the plurality 1 of glass containers according to the invention, the glass container 1 is designed according to its embodiment 37 or the plurality 1 of glass containers is designed according to its embodiment 38, wherein the first silane chemical composition is an aromatic silane chemical composition.

In an embodiment 39 of the glass container 1 according to the invention or in an embodiment 40 of the plurality 1 of glass containers according to the invention, the glass container 1 is designed according to anyone of its embodiment 32 to 39 or the plurality 1 of glass containers is designed according to anyone of its embodiment 33 to 39, wherein the polymer chemical composition is a polyimide chemical composition.

In an embodiment 40 of the glass container 1 according to the invention or in an embodiment 41 of the plurality 1 of glass containers according to the invention, the glass container 1 is designed according to anyone of its embodiment 1 to 39 or the plurality 1 of glass containers is designed according to anyone of its embodiment 1 to 40, wherein the interior volume $V_i$ of the glass container comprises a pharmaceutical composition.

In an embodiment 41 of the glass container 1 according to the invention or in an embodiment 42 of the plurality 1 of glass containers according to the invention, the glass container 1 is designed according to anyone of its embodiment 1 to 40 or the plurality 1 of glass containers is designed according to anyone of its embodiment 1 to 41, wherein the glass container 1 comprises a closure at the top of the glass container 1, preferably a lid.

In an embodiment 42 of the glass container 1 according to the invention or in an embodiment 43 of the plurality 1 of glass containers according to the invention, the glass container 1 is designed according to anyone of its embodiment 1 to 41 or the plurality 1 of glass containers is designed according to anyone of its embodiment 1 to 42, wherein the glass container 1 has not been thermally tempered.

In an embodiment 43 of the glass container 1 according to the invention or in an embodiment 44 of the plurality 1 of glass containers according to the invention, the glass container 1 is designed according to anyone of its embodiment 1 to 42 or the plurality 1 of glass containers is designed according to anyone of its embodiment 1 to 43, wherein the glass of glass container 1 at least in the neck region is characterized by a substantially homogeneous distribution of sodium across the thickness $n_b$ of the glass.

In an embodiment 44 of the glass container 1 according to the invention or in an embodiment 45 of the plurality 1 of glass containers according to the invention, the glass container 1 is designed according to anyone of its embodiment 1 to 43 or the plurality 1 of glass containers is designed according to anyone of its embodiment 1 to 44, wherein the glass of glass container 1 at least in the neck region is characterized by a substantially homogeneous distribution of potassium across the thickness $n_b$ of the glass.

In an embodiment 45 of the glass container 1 according to the invention or in an embodiment 46 of the plurality 1 of glass containers according to the invention, the glass container 1 is designed according to anyone of its embodiment 1 to 44 or the plurality 1 of glass containers is designed according to anyone of its embodiment 1 to 45, wherein the glass of glass container 1 at least in the neck region is characterized by a compressive stress (CS) in the outer surface region in the neck region which is lower than 500 MPa, preferably lower than 300 MPa, even more preferably lower than 170 MPa, even more preferably lower than 80 MPa, even more preferably lower than 30 MPa and most preferably lower than 15 MPa. The compressive stress can, for example, be measured with a polarimeter which is appropriate for vial geometries.

A contribution to solving at least one of the objects according to the invention is made by an embodiment 1 of a process 1 or making an item, preferably a glass container, more preferably a glass container 1 according to the invention or a glass container contained in the plurality 1 of glass containers according to the invention, comprising as process steps providing a glass tube with a first end and a further end, wherein the glass tube is characterized by a longitudinal axis $L_{tube}$, an outer diameter $d_b$ and a glass thickness $n_b$;

heating the first end of the glass tube, while rotating around its major axis, to a temperature above its glass transition temperature, preferably above its softening temperature, with a heating element, preferably with a flame;

while the heated glass tube is rotating around its major axis, shaping the outer contour of the first end so as to obtain ia) a top region that is located at the first end of the glass tube, wherein the outer diameter of the top region is $d_t$ with $d_t<d_b$; ib) a junction region that follows the top region; ic) a neck region that follows the junction region, wherein the outer diameter of the top region is $d_n$ with $d_n<d_t$, and wherein the minimum thickness of the glass in the neck region is $l_n$; and id) a shoulder region that follows the neck region; wherein the junction region has an outer surface that at the end at which the junction region merges into the neck region is substantially circular arc-shaped, the substantially circular arc-shaped area having an outer radius $r_s$, and wherein shaping in process step III) is performed in such a way that an outer counter $c_{outer}$ of the glass tube at the first end is obtained and wherein the following condition is fulfilled: $2\times[l_n/l_b]\times r_s \geq 0.9$ mm; preferably $2\times[l_n/l_b]\times r_s \geq 1.0$ mm; more preferably $2\times[l_n/l_b]\times r_s \geq 1.1$ mm; even more preferably $2\times[l_n/l_b]\times r_s \geq 1.2$ mm; even more preferably $2\times[l_n/l_b]\times r_s \geq 1.3$ mm; even more preferably $2\times[l_n/l_b]\times r_s \geq 1.4$ mm; even most preferably $2\times[l_n/l_b]\times r_s \geq 1.5$ mm; even more preferably $2\times[l_n/l_b]\times r_s \geq 1.7$ mm; even more preferably $2\times[l_n/l_b]\times r_s \geq 2.0$ mm; most preferably $2\times[l_n/l_b]\times r_s \geq 2.5$ mm.

The "softening temperature" of the glass is the temperature at which the glass has a viscosity (determined according to ISO 7884-6:1987) of 10 dPa×sec.

In an embodiment 2 of the process 1 according to the invention, the process 1 is designed according to its embodiment 1, wherein the process comprises the further process steps: heating the glass tube, while rotating around its major axis, at a defined position located above the first end that has been shaped in process step III) to a temperature above its glass transition temperature, preferably above its softening temperature, with a heating element, preferably with a flame; pulling the heated glass tube, while rotating around its major axis, for stretching and creating a container closure; while the heated glass tube is rotating around its major axis, shaping a container closure, preferably while having a temperature above its glass transition temperature, preferably above its softening temperature, so as to obtain a body region that follows the shoulder region and a glass bottom.

In an embodiment 3 of the process 1 according to the invention, the process 1 is designed according to its embodiment 1 or 2, wherein in process step III) shaping the outer contour $c_{outer}$ of the junction region and the neck region is performed by using one or more molding tools, preferably by using one or more molding rollers, that acts/act on predetermined positions of the outer surface of the heated junction region and the heated neck region.

In an embodiment 4 of the process 1 according to the invention, the process 1 is designated according to anyone of its embodiments 1 to 3, wherein shaping in process step III) is performed in such a way that that an outer counter $c_{outer}$ of the glass tube at the first end is obtained that is characterized by the following features: if the glass container is placed on a plane horizontal substrate with the outer surface of the body region on it, within any given cross-section of the glass container that is located in a plane being centrically located in the glass container and comprising the longitudinal axis $L_{tube}$ of the glass tube, f(x) defines the vertical distance between the substrate and the outer surface of the glass container at a given position x and l(x) defines the thickness of the glass at a given position x, wherein the thickness of the glass l(x) is measured in a direction perpendicular to longitudinal axis $L_{tube}$; $k(x)=|f''(x)/[1+f'(x)^2]^{3/2}|$ defines the absolute value of the curvature of f(x) at a given position x; and in the interval between $x=P_1$ and $x=P_2$ for any concave curvature in this interval the minimum value for $[l(x)/l_b]^3/k(x)$ is at least 0.35 mm, preferably at least 0.5 mm, more preferably at least 0.7 mm, even more preferably at least 0.9 mm, even more preferably at least 1.1 mm, even more preferably at least 1.3 mm, even more preferably at least 1.5 mm, even more preferably at least 1.7 mm, even more preferably at least 2.0 mm and most preferably at least 2.5 mm, wherein $P_2$ defines the x-position at which f(x) is $\frac{1}{2}\times d_b - \frac{1}{4}\times d_t - \frac{1}{4}\times d_n$ and $P_1$ is $P_2 - d_t/2 + d_n/2$.

In an embodiment 5 of the process 1 according to the invention the process 1 is designed according to anyone of its embodiments 1 to 4, wherein shaping in process step III) is performed in such a way that, when the minimum thickness of the glass in the neck region is $l_n$, the following condition is fulfilled: $l_n/l_b \geq 1.3$; preferably $l_n/l_b \geq 1.4$; more preferably $l_n/l_b \geq 1.45$; even more preferably $l_n/l_b \geq 1.5$; most preferably $l_n/l_b \geq 1.6$.

In an embodiment 6 of the process 1 according to the invention the process 1 is designed according to anyone its embodiments 1 to 5, wherein shaping in process step III) is performed in such a way that $d_t$ is in the range from 12 to 14 mm, preferably in the range from 12.5 to 13.5 mm and more preferably in the range from 12.7 to 13.2 mm or $d_t$ is in the range from 19 to 21 mm, preferably in the range from 19.5 to 20.5 mm and more preferably in the range from 19.7 to 20.2 mm.

In an embodiment 7 of the process 1 according to the invention the process 1 is designed according to anyone its embodiments 1 to 6, wherein shaping in process step III) is performed in such a way that: if the filling volume is in the range from 1 ml to 8 ml, $d_n$ is in the range from 9 to 12 mm, preferably in the range from 9.5 to 10.5 mm, more preferably in the range from 9.7 to 10.3 mm, even more preferably in the range from 9.8 to 10.3 mm and most preferably in the range from 9.9 to 10.3 mm; if the filling volume is in the range from 8.5 ml to 22 ml, $d_n$ is in the range from 14.5 to 18 mm, preferably in the range from 15.2 to 16.5 mm, more preferably in the range from 15.5 to 16.3 mm, even more preferably in the range from 15.7 to 16.3 mm and most preferably in the range from 15.9 to 16.3 mm; or if filling volume is in the range from 22.5 ml to 150 ml, $d_n$ is in the range from 15.0 to 20 mm, preferably in the range from 16.0 to 17.5 mm, more preferably in the range from 16.5 to 17.3 mm, even more preferably in the range from 16.7 to 17.3 mm and most preferably in the range from 16.9 to 17.3 mm.

In an embodiment 8 of the process 1 according to the invention the process 1 is designed according to anyone its embodiments 1 to 7, wherein shaping in process step III) is performed in such a way that $d_b$ is in the range from 14 to 60 mm, preferably in the range from 15 to 32 mm, more preferably in the range from 15 to 25 mm, even more preferably in the range from 15 to 23 mm and most preferably in the range from 15 to 17 mm.

In an embodiment 9 of the process 1 according to the invention the process 1 is designed according to anyone its embodiments 1 to 8, wherein shaping in process step III) is performed in such a way that $d_b-d_n$ is in the range from 1.5 to 6 mm, preferably in the range from 2 to 5 mm, more preferably in the range from 2.5 to 4.5 mm, even more preferably in the range from 2.5 to 4 mm and most preferably in the range from 2.5 to 3.5 mm.

In an embodiment 10 of the process 1 according to the invention the process 1 is designed according to anyone its embodiments 1 to 9, wherein shaping in process step III) is performed in such a way that $d_b$-$d_n$ is in the range from 4 to 35 mm, preferably in the range from 4 to 15 mm, more preferably in the range from 5 to 13 mm, even more preferably in the range from 5 to 8 mm and most preferably in the range from 5 to 6 mm.

In an embodiment 11 of the process 1 according to the invention the process 1 is designed according to anyone its embodiments 1 to 10, wherein shaping in process step III) is performed in such a way that the shoulder in the shoulder region is characterized by a shoulder angle α and wherein a is in the range from 10 to 70°, preferably in the range from 25 to 60°, more preferably in the range from 33 to 55°, even more preferably in the range from 37 to 50° and most preferably in the range from 38° to 45°.

In an embodiment 12 of the process 1 according to the invention the process 1 is designed according to anyone its embodiments 1 to 11, wherein shaping in process step III) is performed in such a way that the glass container in the container part from the glass bottom up to the top region is rotation-symmetric around the longitudinal axis that goes perpendicular through the centre of the glass tube.

In an embodiment 13 of the process 1 according to the invention the process 1 is designed according to anyone its embodiment 1 to 12, wherein the wall thickness $n_b$ of the glass tube is in a range from ±0.2 mm, preferably ±0.1 mm, more preferably ±0.08 mm and most preferably ±0.05 mm, in each case based on a mean value of this wall thickness in the glass tube.

In an embodiment 14 of the process 1 according to the invention the process 1 is designed according to anyone its embodiments 1 to 13, wherein the glass container is a vial with an interior volume of 1 to 8 ml and wherein shaping in process step III) is performed in such a way that the following conditions are fulfilled: $d_n \geq 9.5$ mm; $r_s \geq 0.5$ mm.

In an embodiment 15 of the process 1 according to the invention the process 1 is designed according to its embodiment 14, wherein shaping in process step III) is performed in such a way that the following conditions are fulfilled: $d_n \geq 9.5$ mm; preferably $d_n \geq 9.6$ mm; more preferably $d_n \geq 9.7$ mm; even more preferably $d_n \geq 9.8$ mm; most preferably $d_n \geq 9.9$ mm.

In an embodiment 16 of the process 1 according to the invention the process 1 is designed according to its embodiment 14 or 15, wherein shaping in process step III) is performed in such a way that the following conditions are fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 17 of the process 1 according to the invention the process 1 is designed according to anyone its embodiments 1 to 13, wherein the glass container is a vial with an interior volume of 8.5 to 22 ml and wherein shaping in process step III) is performed in such a way that the following conditions are fulfilled: $d_n \geq 15.5$ mm; $r_s \geq 0.5$ mm.

In an embodiment 18 of the process 1 according to the invention the process 1 is designed according to its embodiment 17, wherein shaping in process step III) is performed in such a way that the following conditions are fulfilled: $d_n \geq 15.5$ mm; preferably $d_n \geq 15.6$ mm; more preferably $d_n \geq 15.7$ mm; even more preferably $d_n \geq 15.8$ mm; most preferably $d_n \geq 15.9$ mm.

In an embodiment 19 of the process 1 according to the invention the process 1 is designed according to its embodiment 17 or 18, wherein shaping in process step III) is performed in such a way that the following conditions are fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 20 of the process 1 according to the invention the process 1 is designed according to anyone its embodiments 1 to 13, wherein the glass container is a vial with an interior volume of 22.5 to 150 ml and wherein shaping in process step III) is performed in such a way that the following conditions are fulfilled: $d_n \geq 16.5$ mm; $r_s \geq 0.5$ mm.

In an embodiment 21 of the process 1 according to the invention the process 1 is designed according to its embodiment 20, wherein shaping in process step III) is performed in such a way that the following conditions are fulfilled: $d_n \geq 16.5$ mm; preferably $d_n \geq 16.6$ mm; more preferably $d_n \geq 16.7$ mm; even more preferably $d_n \geq 16.8$ mm; most preferably $d_n \geq 16.9$ mm.

In an embodiment 22 of the process 1 according to the invention the process 1 is designed according to its embodiment 20 or 21, wherein shaping in process step III) is performed in such a way that the following conditions are fulfilled: $r_s \geq 0.5$ mm; preferably $r_s \geq 0.55$ mm; more preferably $r_s \geq 0.6$ mm; even more preferably $r_s \geq 0.7$ mm; most preferably $r_s \geq 0.8$ mm.

In an embodiment 23 of the process 1 according to the invention, the process 1 is designed according to any of its embodiments 1 to 22, wherein the glass of the glass tube that is provided in process step I) is of a type selected from the group consisting of a borosilicate glass, an aluminosilicate glass, soda lime glass and fused silica.

In an embodiment 24 of the process 1 according to the invention, the process 1 is designed according to any of its embodiments 1 to 23, wherein the glass container is not thermally tempered.

In an embodiment 25 of the process 1 according to the invention, the process 1 is designed according to any of its embodiments 1 to 24, wherein the glass of glass container at least in the neck region is characterized by a substantially homogeneous distribution of sodium across the thickness $n_b$ of the glass.

In an embodiment 26 of the process 1 according to the invention, the process 1 is designed according to any of its embodiments 1 to 25, wherein the glass of glass container at least in the neck region is characterized by a substantially homogeneous distribution of potassium across the thickness $n_b$ of the glass.

In an embodiment 27 of the process 1 according to the invention, the process 1 is designed according to any of its embodiments 1 to 27, wherein the glass of glass container at least in the neck region is characterized by a compressive stress (CS) in the outer surface region in the neck region which is lower than 500 MPa, preferably lower than 300 MPa, even more preferably lower than 170 MPa, even more preferably lower than 80 MPa, even more preferably lower than 30 MPa and most preferably lower than 15 MPa. The compressive stress can, for example, be measured with a polarimeter which is appropriate for vial geometries.

A contribution to solving at least one of the objects according to the invention is made by an embodiment 1 of a glass container 2 obtainable by the process 1 of the invention according to any of its embodiments 1 to 27. In a preferred embodiment of the glass container 2, this glass container 2 shows the technical features of the glass container 1 of the invention and the technical features of each glass container contained in the plurality 1 of glass containers of the invention according to any of its embodiments, respectively.

A contribution to solving at least one of the objects according to the invention is made by an embodiment 1 of a process 2 comprising as process steps: providing a glass container 1 according to any of its preferred embodiments, a plurality 1 of glass containers according to any of its preferred embodiments, or the glass container 2 according to any of its preferred embodiments; inserting a pharmaceutical composition into the interior volume $V_i$ of the glass container and closing the glass container.

The closing in the process step c) preferably comprises contacting the glass container with a closure, preferably a lid, preferably covering an opening of the glass container with the closure, and joining the closure to the hollow body. The joining preferably comprises creating a form-fit of the glass container, preferably the flange of the glass container, with the closure. The form-fit is preferably created via a crimping step. The process 2 is preferably a process for packaging the pharmaceutical composition.

A contribution to solving at least one of the objects according to the invention is made by an embodiment 1 of a closed glass container obtainable by the process 2 of the invention according to any of its embodiments.

A contribution to solving at least one of the objects according to the invention is made by an embodiment 1 of a process 3 comprising as process steps: providing a glass container 1 according to any of its preferred embodiments, a plurality 1 of glass containers according to any of its preferred embodiments, or the glass container 2 according to any of its preferred embodiments; and administering the pharmaceutical composition to a patient.

A contribution to solving at least one of the objects according to the invention is made by an embodiment 1 of a use 1 of the glass container 1 according to any of its preferred embodiments, of a plurality 1 of glass containers according to any of its preferred embodiments or of the glass container 2 according to any of its preferred embodiments for packaging a pharmaceutical composition. The packaging preferably comprises inserting the pharmaceutical composition into the interior volume and closing the glass container.

Glass Container

The glass container according to the invention or the glass container contained in the plurality of glass containers according to the invention may have any size or shape which the skilled person deems appropriate in the context of the invention. Preferably, the top region of the glass container comprises an opening, which allows for inserting a pharmaceutical composition into the interior volume of the glass container. The glass container comprises as container parts a glass tube with a first end and a further end and a glass bottom that closes the glass tube at the further end. Preferably, the glass container is of a one-piece design that is prepared by providing a glass tube and by shaping one end thereof (i.e. the end that will be the opening of the glass container) so as to obtain a top region, a junction region, a neck region and a shoulder region followed by a step of shaping the further end of the glass tube so as to obtain a closed glass bottom. A preferred glass container is a pharmaceutical glass container, more preferably one selected from the group consisting of a vial, an ampoule or a combination thereof, wherein a vial is particularly preferred.

For the use in this document, the interior volume $V_i$ represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

Glass

The glass of the container may be any type of glass and may consist of any material or combination of materials which the skilled person deems suitable in the context of the invention. Preferably, the glass is suitable for pharmaceutical packaging. Particularly preferable, the glass is of type I, more preferably type I b, in accordance with the definitions of glass types in section 3.2.1 of the European Pharmacopoeia, $7^{th}$ edition from 2011. Additionally, or alternatively preferable to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, preferably more than 9 wt.-%, particularly preferable in a range from 9 to 20 wt.-%, in each case based on the total weight of the glass. A preferred aluminosilicate glass has a content of $B_2O_3$ of less than 8 wt.-%, preferably at maximum 7 wt.-%, particularly preferably in a range from 0 to 7 wt.-%, in each case based on the total weight of the glass. For the use in this document, a borosilicate glass is a glass which has a content of $B_2O_3$ of at least 1 wt.-%, preferably at least 2 wt.-%, more preferably at least 3 wt.-%, more preferably at least 4 wt.-%, even more preferably at least 5 wt.-%, particularly preferable in a range from 5 to 15 wt.-%, in each case based on the total weight of the glass. A preferred borosilicate glass has a content of $Al_2O_3$ of less than 7.5 wt.-%, preferably less than 6.5 wt.-%, particularly preferably in a range from 0 to 5.5 wt.-%, in each case based on the total weight of the glass. In a further aspect, the borosilicate glass has a content of $Al_2O_3$ in a range from 3 to 7.5 wt.-%, preferably in a range from 4 to 6 wt.-%, in each case based on the total weight of the glass.

A glass which is further preferred according to the invention is essentially free from B. Therein, the wording "essentially free from B" refers to glasses which are free from B which has been added to the glass composition by purpose. This means that B may still be present as an impurity, but preferably at a proportion of not more than 0.1 wt.-%, more preferably not more than 0.05 wt.-%, in each case based on the weight of the glass.

Outer Contour of the Junction Region

An important element of the glass container 1 according to the invention, of the glass containers contained in the plurality 1 of glass containers according to the invention and of the glass container 2 according to the invention is the mechanical strength of the neck region towards a load that is laterally applied to the neck region in the neck side compression test as described in section "Measurement Methods", wherein this mechanical strength can, for example, be realized by a very special outer contour co, of the glass container in the junction region, i.e. in the transition area between the top region and the neck region, this outer contour $c_{outer}$ being characterized by a certain minimum value for the term $2 \times [l_n/l_b] \times r_s \geq 0.9$ mm, wherein $l_n$ corresponds to the minimum thickness of the glass in the neck region [mm], $l_b$ corresponds to the thickness of the glass in the body region [mm] and $r_s$ corresponds the outer radius of the substantially circular arc-shaped area outer surface at the end of the junction region at which the junction region merges into the neck region [mm].

Pharmaceutical Composition

In the context of the invention, every pharmaceutical composition which the skilled person deems suitable comes into consideration. A pharmaceutical composition is a composition comprising at least one active ingredient. A preferred active ingredient is a vaccine. The pharmaceutical composition may be fluid or solid or both, wherein a fluid composition is particularly preferred herein. A preferred solid composition is granular such as a powder, a multitude of tablets or a multitude of capsules. A further preferred pharmaceutical composition is a parenterialium, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

According to a first preferred embodiment of the glass container 1 according to the present invention the glass container is a vial with an overflow capacity equal to or larger than 1 ml up to maximal 5 ml, preferably a vial with a size designation "2R" according to DIN EN ISO 8362-1: 2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 9.5 to 16.5 mm, more preferably in the range from 11 to 15 mm and even more preferably in the range from 12.5 to 13.5 mm; $d_n$ is in the range from 8 to 13 mm, more preferably in the range from 9 to 12 mm and even more preferably in the range from 10 to 11 mm; $d_b$ is in the range from 14 to 18 mm, more preferably in the range from 15 to 17 mm and even more preferably in the range from 15.5 to 16.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 32 to 38 mm, more preferably in the range from 33.5 to 36.5 mm and even more preferably in the range from 34.5 to 35.5 mm; $h_b$ is in the range from 12 to 32 mm, more preferably in the range from 17 to 27 mm and even more preferably in the range from 21 to 23 mm; $h_{t-n}$ is in the range from 6 to 10 mm, more preferably in the range from 7 to 9 mm and even more preferably in the range from 7.5 to 8.5 mm.

According to a second preferred embodiment of the glass container 1 according to the present invention the glass container is a vial with an overflow capacity of larger than 4 ml up to maximal 8 ml, preferably a vial with a size designation "4R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 9.5 to 16.5 mm, more preferably in the range from 11 to 15 mm and even more preferably in the range from 12.5 to 13.5 mm; $d_n$ is in the range from 8 to 13 mm, more preferably in the range from 9 to 12 mm and even more preferably in the range from 10 to 11 mm; $d_b$ is in the range from 14 to 18 mm, more preferably in the range from 15 to 17 mm and even more preferably in the range from 15.5 to 16.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 42 to 48 mm, more preferably in the range from 43.5 to 46.5 mm and even more preferably in the range from 44.5 to 45.5 mm; $h_b$ is in the range from 22 to 42 mm, more preferably in the range from 27 to 37 mm and even more preferably in the range from 31 to 33 mm; $h_{t-n}$ is in the range from 6 to 10 mm, more preferably in the range from 7 to 9 mm and even more preferably in the range from 7.5 to 8.5 mm.

According to a third preferred embodiment of the glass container 1 according to the present invention the glass container is a vial with an overflow capacity of larger than 8 ml up to maximal 10.75 ml, preferably a vial with a size designation "6R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 14 to 19 mm, more preferably in the range from 15 to 18 mm and even more preferably in the range from 16 to 17 mm; $d_b$ is in the range from 19.5 to 24.5 mm, more preferably in the range from 20.5 to 23.5 mm and even more preferably in the range from 21.5 to 22.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 37 to 43 mm, more preferably in the range from 38.5 to 41.5 mm and even more preferably in the range from 39.5 to 40.5 mm; $h_b$ is in the range from 16 to 36 mm, more preferably in the range from 21 to 31 mm and even more preferably in the range from 25 to 27 mm; $h_{t-n}$ is in the range from 6.5 to 10.5 mm, more preferably in the range from 7.5 to 9.5 mm and even more preferably in the range from 8 to 9 mm.

According to a fourth preferred embodiment of the glass container 1 according to the present invention the glass container is a vial with an overflow capacity of larger than 10.75 ml up to maximal 12.5 ml, preferably a vial with a size designation "8R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 14 to 19 mm, more preferably in the range from 15 to 18 mm and even more preferably in the range from 16 to 17 mm; $d_b$ is in the range from 19.5 to 24.5 mm, more preferably in the range from 20.5 to 23.5 mm and even more preferably in the range from 21.5 to 22.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably $\geq 1.5$ mm, more preferably ≥1.8 mm and even more preferably ≥2.1 mm; $2\times[l_n/l_b]\times r_s \geq 0.9$ mm, preferably ≥1.5 mm and more preferably ≥2.0 mm; $h_c$ is in the range from 42 to 47 mm, more preferably in the range from 43.5 to 46.5 mm and even more preferably in the range from 44.5 to 45.5 mm; $h_b$ is in the range from 21 to 41 mm, more preferably in the range from 26 to 36 mm and even more preferably in the range from 30 to 32 mm; $h_{t-n}$ is in the range from 6.5 to 10.5 mm, more preferably in the range from 7.5 to 9.5 mm and even more preferably in the range from 8 to 9 mm.

According to a fifth preferred embodiment of the glass container 1 according to the present invention the glass container is a vial with an overflow capacity of larger than 12.5 ml up to maximal 16.25 ml, preferably a vial with a size designation "10R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 14 to 19 mm, more preferably in the range from 15 to 18 mm and even more preferably in the range from 16 to 17 mm; $d_b$ is in the range from 21 to 27 mm, more preferably in the range from 22 to 26 mm and even more preferably in the range from 23.5 to 24.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably ≥1.5 mm, more preferably ≥1.8 mm and even more preferably ≥2.1 mm; $2\times[l_n/l_b]\times r_s \geq 0.9$ mm, preferably ≥1.5 mm and more preferably ≥2.0 mm; $h_c$ is in the range from 42 to 47 mm, more preferably in the range from 43.5 to 46.5 mm and even more preferably in the range from 44.5 to 45.5 mm; $h_b$ is in the range from 20 to 40 mm, more preferably in the range from 25 to 35 mm and even more preferably in the range from 29 to 31 mm; $h_{t-n}$ is in the range from 7 to 11 mm, more preferably in the range from 8 to 10 mm and even more preferably in the range from 8.5 to 9.5 mm.

According to a sixth preferred embodiment of the glass container 1 according to the present invention the glass container is a vial with an overflow capacity of larger than 16.25 ml up to maximal 22.5 ml, preferably a vial with a size designation "15R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 14 to 19 mm, more preferably in the range from 15 to 18 mm and even more preferably in the range from 16 to 17 mm; $d_b$ is in the range from 21 to 27 mm, more preferably in the range from 22 to 26 mm and even more preferably in the range from 23.5 to 24.5 mm; $l_b$ is in the range from 0.4 to 2 mm, more preferably in the range from 0.8 to 1.3 mm and even more preferably in the range from 0.9 to 1.15 mm; minimum value of $[l(x)/l_b]^3/k(x) \geq 0.35$ mm, preferably ≥1.5 mm, more preferably ≥1.8 mm and even more preferably ≥2.1 mm; $2\times[l_n/l_b]\times r_s \geq 0.9$ mm, preferably ≥1.5 mm and more preferably ≥2.0 mm; $h_c$ is in the range from 56 to 64 mm, more preferably in the range from 58 to 62 mm and even more preferably in the range from 59.5 to 60.5 mm; $h_b$ is in the range from 35 to 55 mm, more preferably in the range from 40 to 50 mm and even more preferably in the range from 44 to 46 mm; $h_{t-n}$ is in the range from 7 to 11 mm, more preferably in the range from 8 to 10 mm and even more preferably in the range from 8.5 to 9.5 mm.

According to a seventh preferred embodiment of the glass container 1 according to the present invention the glass container is a vial with an overflow capacity of larger than 22.5 ml up to maximal 29.25 ml, preferably a vial with a size designation "20R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_b$ is in the range from 17.5 to 23.0 mm, more preferably in the range from 18.5 to 22.0 mm and even more preferably in the range from 19.5 to 20.5 mm; $d_n$ is in the range from 15 to 20 mm, more preferably in the range from 16 to 19 mm and even more preferably in the range from 17 to 18 mm; $d_b$ is in the range from 27 to 33 mm, more preferably in the range from 28 to 32 mm and even more preferably in the range from 29.5 to 30.5 mm; $l_b$ is in the range from 0.5 to 2.5 mm, preferably in the range from 0.7 to 2 mm, even more preferably in the range from 0.9 to 1.6 mm and most preferably in the range from 1.15 to 1.25 mm; minimum value of $[l(x)/l_b]^3/k(x) \geq 0.35$ mm, preferably ≥1.5 mm, more preferably ≥1.8 mm and even more preferably ≥2.1 mm; $2\times[l_n/l_b]\times r_s \geq 0.9$ mm, preferably ≥1.5 mm and more preferably ≥2.0 mm; $h_c$ is in the range from 51 to 59 mm, more preferably in the range from 53 to 57 mm and even more preferably in the range from 54.5 to 55.5 mm; $h_b$ is in the range from 15 to 55 mm, more preferably in the range from 25 to 45 mm, even more preferably in the range from 30 to 40 mm and most preferably in the range from 34 to 36 mm; $h_{t-n}$ is in the range from 7 to 13 mm, more preferably in the range from 8.5 to 11.5 mm and even more preferably in the range from 9.25 to 10.75 mm.

According to an eighth preferred embodiment of the glass container 1 according to the present invention the glass container is a vial with an overflow capacity of larger than 29.25 ml up to maximal 35 ml, preferably a vial with a size designation "25R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 15 to 20 mm, more preferably in the range from 16 to 19 mm and even more preferably in the range from 17 to 18 mm; $d_b$ is in the range from 27 to 33 mm, more preferably in the range from 28 to 32 mm and even more preferably in the range from 29.5 to 30.5 mm; $l_b$ is in the range from 0.5 to 2.5 mm, preferably in the range from 0.7 to 2 mm, even more preferably in the range from 0.9 to 1.6 mm and most preferably in the range from 1.15 to 1.25 mm; minimum value of $[l(x)/l_b]^3/k(x) \geq 0.35$ mm, preferably ≥1.5 mm, more preferably ≥1.8 mm and even more preferably ≥2.1 mm; $2\times[l_n/l_b]\times r_s \geq 0.9$ mm, preferably ≥1.5 mm and more preferably ≥2.0 mm; $h_c$ is in the range from 61 to 69 mm, more preferably in the range from 63 to 67 mm and even more preferably in the range from 64.5 to 65.5 mm; $h_b$ is in the range from 25 to 65 mm, more preferably in the range from 35 to 55 mm, even more preferably in the range from 40 to 50 mm and most preferably in the range from 44 to 46 mm; $h_{t-n}$ is in the range from 7 to 13 mm, more preferably in the range from 8.5 to 11.5 mm and even more preferably in the range from 9.25 to 10.75 mm.

According to a ninth preferred embodiment of the glass container 1 according to the present invention the glass container is a vial with an overflow capacity of larger than 35 ml up to maximal 49.75 ml, preferably a vial with a size designation "30R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 15 to 20 mm, more preferably in the range from 16 to 19 mm and even more preferably in the range from 17 to 18 mm; $d_b$ is in the range from 27 to 33 mm, more preferably in the range from 28 to 32 mm and even more preferably in the range from 29.5 to 30.5 mm; $l_b$ is in the range from 0.5 to 2.5 mm, preferably in the range from 0.7 to 2 mm, even more preferably in the range from 0.9 to 1.6 mm and most preferably in the range from 1.15 to 1.25 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 71 to 79 mm, more preferably in the range from 73 to 77 mm and even more preferably in the range from 74.5 to 75.5 mm; $h_b$ is in the range from 35 to 75 mm, more preferably in the range from 45 to 65 mm, even more preferably in the range from 50 to 60 mm and most preferably in the range from 54 to 56 mm; $h_{t-n}$ is in the range from 7 to 13 mm, more preferably in the range from 8.5 to 11.5 mm and even more preferably in the range from 9.25 to 10.75 mm.

According to a tenth preferred embodiment of the glass container 1 according to the present invention the glass container is a vial with an overflow capacity of larger than 49.75 ml up to maximal 92.5 ml, preferably a vial with a size designation "50R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 15 to 20 mm, more preferably in the range from 16 to 19 mm and even more preferably in the range from 17 to 18 mm; $d_b$ is in the range from 37 to 43 mm, more preferably in the range from 38 to 42 mm and even more preferably in the range from 39.5 to 40.5 mm; $l_b$ is in the range from 0.5 to 2.5 mm, preferably in the range from 0.7 to 2 mm, even more preferably in the range from 0.9 to 1.6 mm and most preferably in the range from 1.15 to 1.25 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 69 to 77 mm, more preferably in the range from 71 to 75 mm and even more preferably in the range from 72.5 to 73.5 mm; $h_b$ is in the range from 29 to 69 mm, more preferably in the range from 39 to 59 mm, even more preferably in the range from 44 to 54 mm and most preferably in the range from 48 to 50 mm; $h_{t-n}$ is in the range from 7 to 13 mm, more preferably in the range from 8.5 to 11.5 mm and even more preferably in the range from 9.25 to 10.75 mm.

According to an eleventh preferred embodiment of the glass container 1 according to the present invention the glass container is a vial with an overflow capacity of larger than 92.5 ml up to maximal 150 ml, preferably a vial with a size designation "100R" according to DIN EN ISO 8362-1:2016-06, wherein it is furthermore preferred that at least one, preferably all of the following conditions i) to x) is/are fulfilled: $r_s$ is in the range from 0.5 to 1.0 mm, more preferably in the range from 0.6 to 0.95 mm and even more preferably in the range from 0.75 to 0.9 mm; $d_t$ is in the range from 17.5 to 23.0 mm, more preferably in the range from 18.5 to 22.0 mm and even more preferably in the range from 19.5 to 20.5 mm; $d_n$ is in the range from 15 to 20 mm, more preferably in the range from 16 to 19 mm and even more preferably in the range from 17 to 18 mm; $d_b$ is in the range from 43 to 51 mm, more preferably in the range from 45 to 49 mm and even more preferably in the range from 46.5 to 47.5 mm; $l_b$ is in the range from 0.5 to 2.5 mm, preferably in the range from 0.7 to 2 mm, even more preferably in the range from 0.9 to 1.6 mm and most preferably in the range from 1.15 to 1.25 mm; minimum value of $[l(x)/l_b]^3/k(x) \geq 0.35$ mm, preferably $\geq 1.5$ mm, more preferably $\geq 1.8$ mm and even more preferably $\geq 2.1$ mm; $2 \times [l_n/l_b] \times r_s \geq 0.9$ mm, preferably $\geq 1.5$ mm and more preferably $\geq 2.0$ mm; $h_c$ is in the range from 96 to 103 mm, more preferably in the range from 98 to 101 mm and even more preferably in the range from 99.5 to 100.5 mm; $h_b$ is in the range from 55 to 95 mm, more preferably in the range from 65 to 85 mm, even more preferably in the range from 70 to 80 mm and most preferably in the range from 74 to 76 mm; $h_{t-n}$ is in the range from 7 to 13 mm, more preferably in the range from 8.5 to 11.5 mm and even more preferably in the range from 9.25 to 10.75 mm.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Determination of the Local Curvature K(X) and the Local Glass Thickness L(X)

The local curvature k(x) of the outer contour co, defined by the function f(x) as well as the local thickness l(x) of the glass in the junction region, i. e. in transition area between the top region and the neck region, can be determined in a non-destructive manner using a profile projector. This approach is particularly suitable for glass containers that have been chemically and/or thermally tempered and that therefore cannot be easily sliced in half without the glass cracking or bursting. For determining the local curvature k(x) in a non-destructive manner the outer contour of the glass containers is visualized using a Mitutoyo PJ-3000 profile projector. The profile projector has a 10× magnification and is operated with transmitted light illumination. The vials are placed in Hallbrite® BHB (a butyloctyl salicylate obtainable from the Hallstar Company, Chicago, USA), which is filled into a glass bowl. Hallbrite® BHB is used to visualize the outer contour of the vial. It is ensured that the cross-section of the glass container that is inspected in the profile projector corresponds to the plane that is centrically located in the glass container and that comprises the longitudinal axis $L_{tube}$ of the glass container, i. e. the axis that goes perpendicular through the centre of the bottom (see FIGS. 5A and 5B).

To improve the measuring accuracy, the outer contour $c_{outer}$ as well as the local thickness $l(x)$ of the glass in the transition area between the top region and in the neck region can also be determined from a physical cross-sectional cut parallel along to the longitudinal axis of the container (it is again ensured that the cross-section of the glass container corresponds to the plane that is centrically located in the glass container and that comprises the longitudinal axis as shown in FIGS. 5A and 5B). For preparation without breakage, the container may be embedded into transparent 2-component epoxy resin, for example STRUERS GmbH, EpoFix Resin, or other suitable materials. After curing of the epoxy resin, a cross-sectional cut parallel along to the container axis can be achieved by machine-supported sawing, grinding and polishing. Geometrical features of the container can then be determined (measured) by means of non-distorting image capturing and geometrical analysis software tools.

The thickness of the glass $l(x)$ measured in a direction perpendicular to longitudinal axis $L_{tube}$ can be determined from these images by means of an electronic ruler with any appropriate image analysis software tool.

The relevant outer contour $c_{outer}$ of the outer surface of the glass containers in the transition region between the top region and the bottom region can be extracted and numerically approximated from the images obtained by means of the two approaches described above. For the extraction of the relevant contour of the outer surface, the images undergo the image processing steps implemented in Python [https://www.python.org/] based on the image processing library OpenCV [https://opencv.org/].

First, the images are denoised using a median filter. The denoised images are then processed with an edge detection algorithm based on a Sobel filter, in which the contours are identified by thresholding the gradient image. For the calculation of slopes and curvatures, the extracted contours are numerically approximated by a univariate spline of order 5. The radii of curvature R(x) are then given by the formula $$R = \frac{\left(1+\left(\frac{dx}{dy}\right)^2\right)^{\frac{3}{2}}}{\frac{d^2x}{dy^2}}$$

wherein $R(x) = 1/k(x)$.

Determination of $R_S$

For the determination of the outer radius $r_s$ of the substantially circular arc-shaped area at the end of the junction region that merges into the neck region in images obtained by means of the two approaches described above point A on the outer surface of the junction region is determined at which the slope β of the tangent reaches its maximum value (see FIG. 6). In case of a liner area in which the slope β of the tangent reaches a maximum value, A is defined at the point which is nearest to the neck region. In a second step, line b is defined as the extension of the essentially non-curved outer surface of the neck region. Now the largest possible circle is formed, which is adjacent at point A and coincides at gradient (=bevel circle) and which only touches line b (at point B), but does not cross it (see again FIG. 6). The radius of that circle corresponds to $r_s$.

Wall Thicknesses and Diameters

The wall thickness of the glass container at a given position as well as the inner or outer diameter of the glass container at a given position are determined in accordance with DIN ISO 8362-1.

Neck Squeeze Test

The mechanical resistance of the vial neck section against diametral compression is determined by means of a diametral load strength testing adapted from DIN EN ISO 8113 ("Glass containers—Resistance to vertical load—Test methods"), where a compressive force is applied in diametral (radial) direction at two opposing positions of the vial neck outer surface geometry. The compressive force is increased at a constant load rate of 2000 N/min until breakage of the container using a universal testing machine (breakage can be detected as a sudden drop in the force-time diagram F(t)). The diametral load is applied by two opposing, uniaxial concave steel surfaces, between which the neck section of the vial is placed parallel to the axis. One of the concave surfaces is constructed to be self-adjusting to be able to compensate geometrical irregularities. The radius of the concavity of the two steel surfaces is 25% larger than the radius of the outer diameter of the neck section, so that the load is applied along two opposing lines. The width of the concave steel surfaces is chosen to be slightly shorter than the height of the vial neck section.

Side Compression Test

The mechanical resistance of the vial body section against diametral compression is determined by means of a diametral load strength testing adapted from DIN EN ISO 8113 ("Glass containers—Resistance to vertical load—Test methods"), where a compressive force is applied in diametral (radial) direction at two opposing positions of the vial body outer surface geometry. The compressive force is increased at a constant load rate of 1500 N/min until breakage of the container using a universal testing machine (breakage can again be detected as a sudden drop in the force-time diagram F(t)). The diametral load is applied by two opposing, uniaxial concave steel surfaces, between which the body section of the vial is placed parallel to the axis. One of the concave surfaces is constructed to be self-adjusting to be able to compensate geometrical irregularities. The radius of the concavity of the two steel surfaces is 25% larger than the radius of the outer diameter of the body section, so that the load is applied along two opposing lines. The width of the concave steel surfaces is chosen to be larger than the height of the vial body section.

EXAMPLES

A glass tube having an outer diameter of 16 mm and a wall thickness $l_b$ of 1 mm made of borosilicate glass is loaded into the head of a rotary machine. While rotating around its major axis the glass tube is heated at the bottom end to its softening point with flames and the heated end is shaped to form the top region, the junction region, the neck region and the shoulder region. For the formation of the desired shape of these regions in the rotary machine the glass tube is brought in an upward position as indicated in FIG. 8. By using support rollers having the desired outer shape to ensure that the required value for $r_s$ and the required values for $d_r$-$d_n$, $d_n$ and $l_n$ are always realized in the transition area between the top region and the neck region the outer contour $c_{outer}$ in the top region, the junction region, the neck region and the shoulder region is formed. Further information for forming these regions of a glass vial can also be found at https://www.schott.com/pharmaceutical_packaging/german/about_us/videos.html.

In a further step, the glass tube, while rotating around its major axis, is heated at a position above the first end that has been previously shaped to its softening point with flames and the heated glass is pulled along its major axis for stretching and creating a container closure.

By means of the above described process and by varying the shape of the support rollers, glass containers with a size designation "10R" according to DIN EN ISO 8362-1:2016-06 which differ with respect to the shape of the outer contour $c_{outer}$ in the junction region, i. e. in the transition area between the top region and the neck region has been generated.

For each shape at least 50 glass containers have been prepared in the rotary machine. The shape of one of the outer contours $c_{outer}$ in the transition area between the top region and the neck region corresponds to the shape of that area in glass containers known in the prior art (Comparative Example 1).

TABLE 1

| Glass container | $d_t$ [mm] | $d_n$ [mm] | $d_b$ [mm] | $2 \times [l_n/l_b] \times r_s$ [mm] | $[l(x)/l_b]^3/k(x)^{1)}$ [mm] |
| --- | --- | --- | --- | --- | --- |
| Comparative Example 1 | 20 | 15.4 | 24 | 0.84 | 0.32 |
| Example 1 | 20 | 15.7 | 24 | 2.17 | 1.83 |

The minimum value for $[l(x)/l_b]^3/k(x)$ in the interval between points $P_1$ and $P_2$ is given in the table above.

Evaluation

From the above described glass containers the resistance to withstand loads in the neck squeeze test as well as in the side compression test have been determined. For each shape of the outer contour $c_{outer}$ in the transition area between the top region and the neck region 50 vials have been tested. The loads that have been determined correspond to the pressures at which 10% of the vials break. The results are shown in TABLE 2, wherein the corresponding load values for side compression test are standardised to the values that have been determined for the reference vial of the Comparative Example.

TABLE 2

| Glass container | resistance to load in the neck squeeze test [N] | resistance to load in the side compression test [%] |
| --- | --- | --- |
| Comparative Example 1 | 1007 | 100 |
| Example 1 | 1676 | 116 |

As can be seen from the results shown in TABLE 2, by adjusting the outer contour $c_{outer}$ in the transition area between the top region and the neck region as well as by adjusting the resistance neck squeeze test the resistance to loads in the side compression test can be significantly increased.

BRIEF DESCRIPTION OF THE DRAWINGS

Unless otherwise specified in the description or the particular figure.

DETAILED DESCRIPTION

Figure 1:
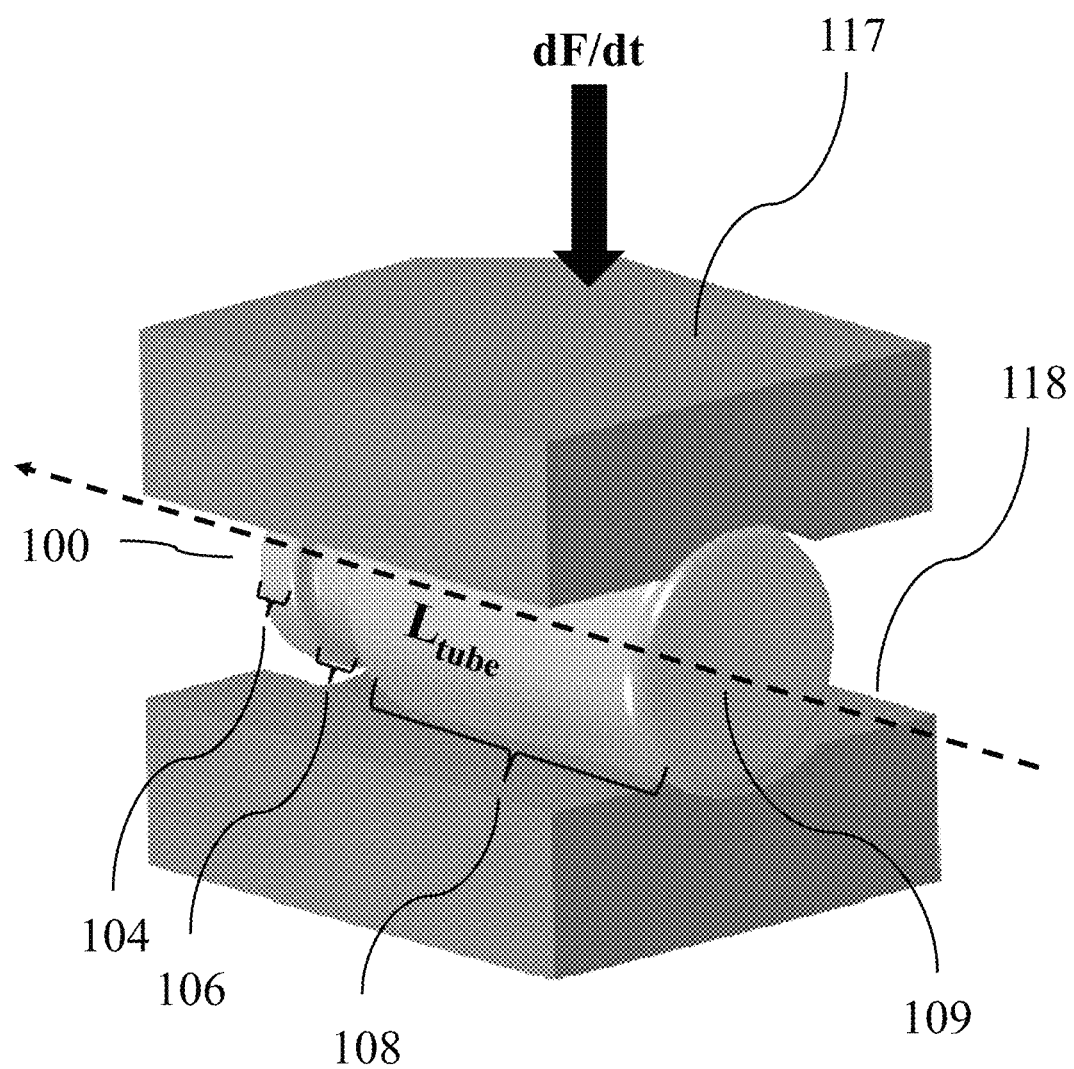
FIG. 1 shows the set-up of a side compression test known from the prior art.

FIG. 1 shows the set-up of a side compression test known from the prior art. As can be seen, the glass container 100 with a glass bottom 109 is placed in a horizontal position sandwiched between two steel plates 117,118 by means of which a compressive force is applied in diametral (radial) direction at two opposing positions of the vial body outer surface geometry. The compressive force is increased at a constant load rate of 1500 N/min until breakage of the container using a universal testing machine. The diametral load is applied by two opposing, uniaxial concave steel surfaces 117, 118, between which the body region 109 of the vial 100 is placed parallel to the axis $L_{tube}$. One of the concave surfaces 117 is constructed to be self-adjusting to be able to compensate geometrical irregularities. The radius of the concavity of the two steel surfaces 117,118 is 25% larger than the radius of the outer diameter $d_b$ of the body region, so that the load is applied along two opposing lines. The width of the concave steel surfaces is chosen to be larger than the height of the vial body region 108. As can also be seen in FIG. 1, neither the top region 104 nor the junction region 105 or the neck region 106 come into contact with the clamping jaws 117,118 as $d_t$ (the diameter of the top region 104) and $d_n$ (the diameter of the neck region 106) are smaller than $d_b$ (the diameter of the body region 108).

Figure 2:
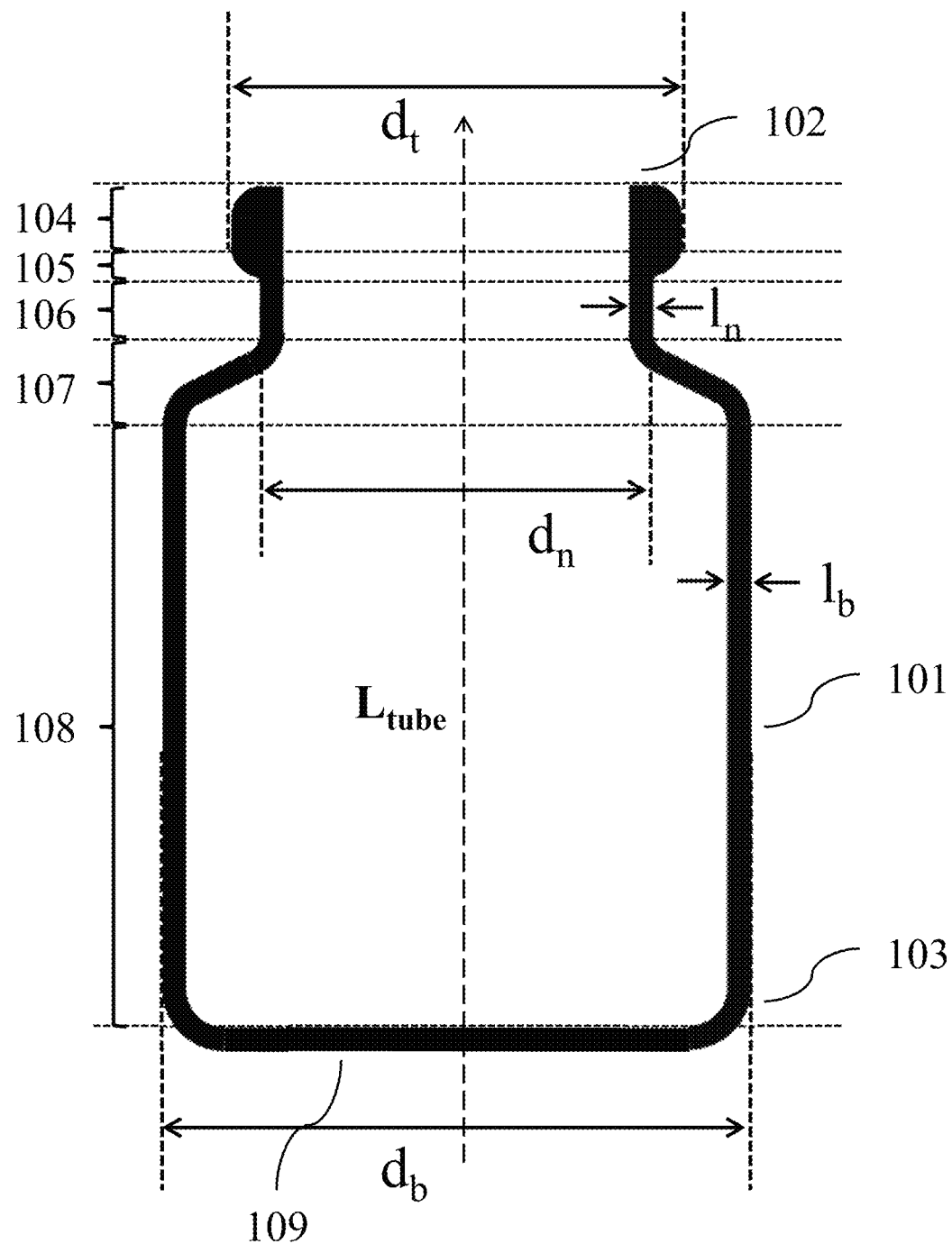
FIG. 2 shows in a cross-sectional view the different regions of a glass container 100 according to the invention.

FIG. 2 shows in a cross-sectional view the different regions of a glass container 100 according to the invention. The glass container 100 comprises as container parts a glass tube 101 with a first end 102 and a further end 103 and a glass bottom 109 that closes the glass tube 101 at the further end 103. The glass tube 101 is characterized by a longitudinal axis $L_{tube}$ and comprises, in a direction from the top to the bottom, a top region 104 that is located at the first end 102 of the glass tube 101, wherein the outer diameter of the top region is $d_t$, a junction region 105 that follows the top region 104, a neck region 106 that follows the junction region 105, wherein the outer diameter of the neck region is $d_n$ with $d_n<d_t$, a shoulder region 107 that follows the neck region 106; and a body region 108 that follows the shoulder region 107 and that extends to the further end 103 of the glass tube 101, wherein the thickness of the glass in the body region is $l_b$ and wherein the outer diameter of the body region is $d_b$ with $d_b>d_t$. Junction region 105 corresponds to the transition area between the top region 104 and the neck region 106. $l_n$ is the minimum thickness of the glass in the neck region 106. The neck region 106 is defined by a substantially linear and almost horizontal course of the function f(x) defining the outer contour $c_{outer}$ of the glass container 100 (see FIG. 4B). The beginning and the ending of the neck region 106 are thus defined by those points at which the course of this function f(x) is no longer linear and horizontal. The beginning and the ending of the neck region 106 are indicated as points $x_1$ and $x_2$ and FIG. 4B.

Figure 3:
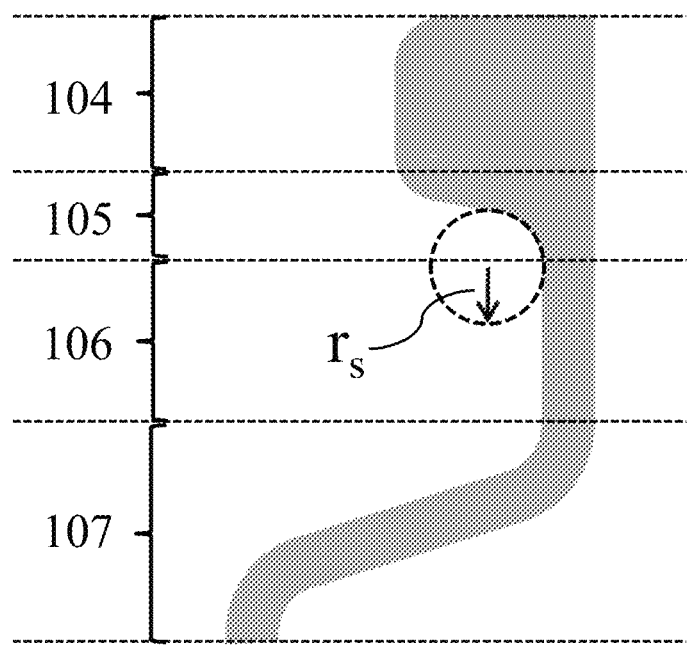
FIG. 3 shows in an enlarged cross-sectional view the top region 104, the junction region 105, the neck region 106 and the shoulder region 107 of a glass container 100 according to the invention.

FIG. 3 shows in an enlarged cross-sectional view the top region 104, the junction region 105, the neck region 106 and the shoulder region 107 of a glass container 100 according to the invention (the body region 108 that follows the shoulder region 109 is not shown in that figure). In FIG. 3 the junction region 105 has an outer surface that at the end at which the junction region 105 merges with the neck region 106 is substantially circular arc-shaped, the substantially circular arc-shaped area having an outer radius $r_s$.

Figure 4A:
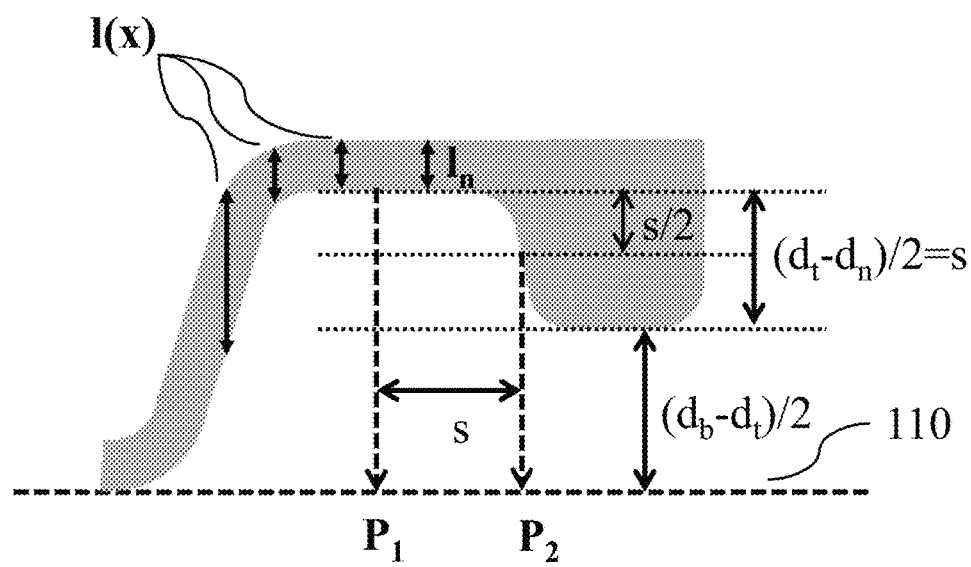
FIG. 4A shows in an enlarged cross-sectional view the determination of the outer contour $c_{outer}$ of the top region 104, the junction region 105, the neck region 106 and the shoulder region 107 of a glass container 100 according to the invention.
Figure 4B:
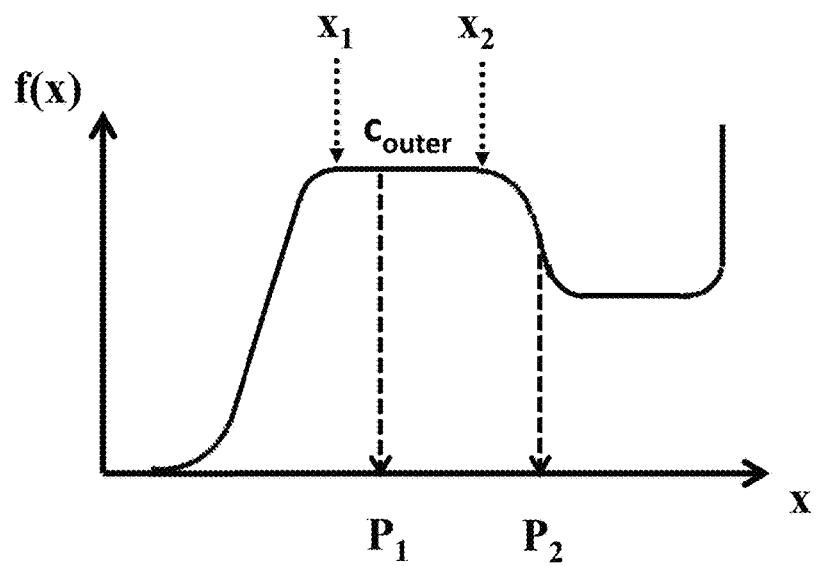
FIG. 4B shows the course of the function f(x) within the range from $P_1$ to $P_2$ that describes the outer contour $c_{outer}$ in the transition area between the top region and the neck region.

FIG. 4A shows in an enlarged cross-sectional view the determination of the outer contour $c_{outer}$ of the top region 104, the junction region 105, the neck region 106 and the shoulder region 107 of a glass container 100 according to the invention based on images of the glass container 100 as they have been obtained with the methods described herein in the section "Test methods". These images are positioned in such a way that glass container 100 is placed on a plane horizontal substrate 110 with the outer surface of the body region 108 on it. k(x) and l(x) are then determined between points $P_1$ and $P_2$ as also described herein in the section "Test methods". s corresponds to $(d_b-d_n)/2$, s/2 corresponds to $(d_b-d_n)/4$ which means that $P_2$ is the x-position at which f(x) is $(d_b-d_t)/2+s/2=(d_b-d_t)/2+(d_b-d_n)/4=\frac{1}{2}\times d_b-\frac{1}{4}\times d_t-\frac{1}{4}\times d_n$. $P_1$ is then the x-position $P_2-s=P_2-d_b/2+d_n/2$. FIG. 4B shows the course of the function f(x) describing the outer contour $c_{outer}$ between points $P_1$ and $P_2$. Points $x_1$ and $x_2$ indicate the beginning and the ending of the neck region 106.

Figure 5A:
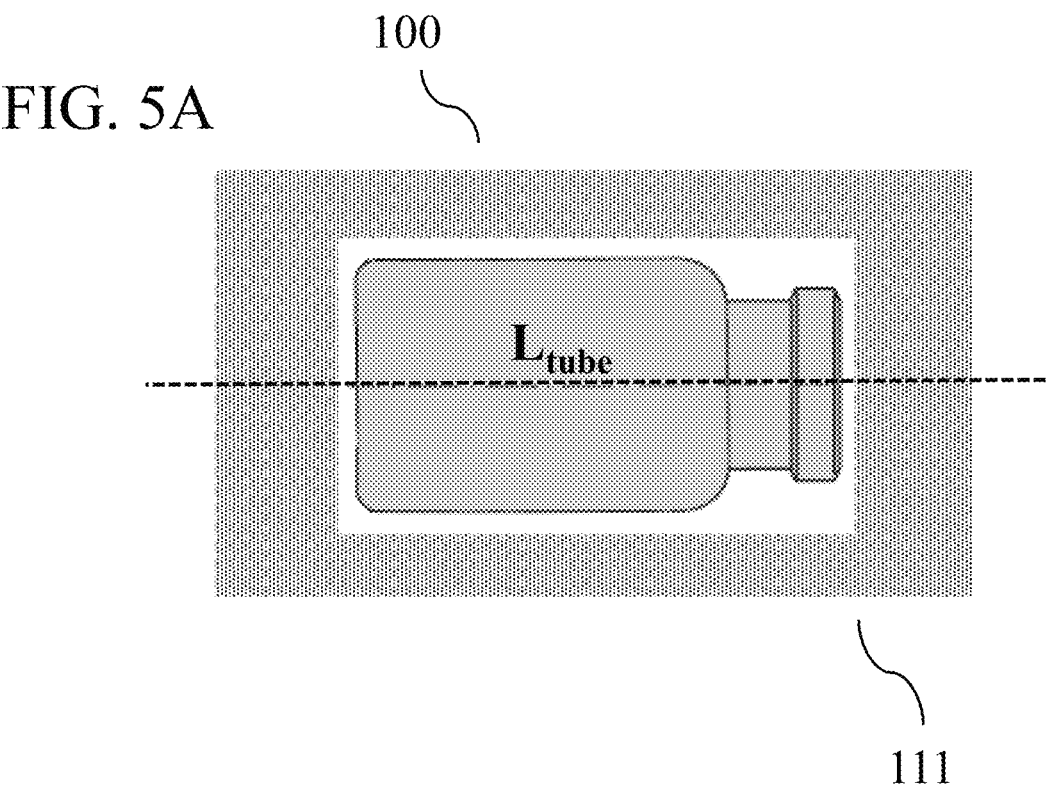
FIG. 5A shows in a side view the localization of plane 111 that is used to determine the local curvature of function f(x) as well as the glass thickness l(x) within the range from $P_1$ to $P_2$.
Figure 5B:
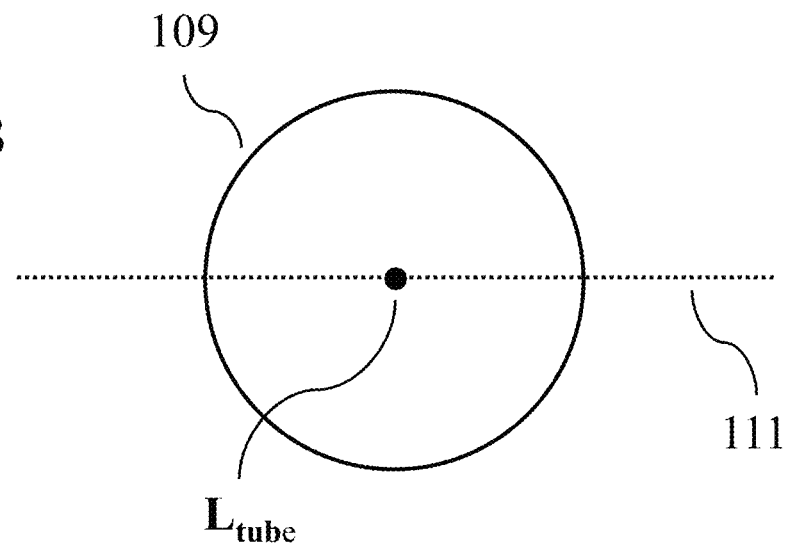
FIG. 5B shows in a top view the localization of plane 111 that is used to determine the local curvature of function f(x) as well as the glass thickness l(x) within the range from $P_1$ to $P_2$.

FIGS. 5A and 5B show in a side view and in a top view the localization of plane 111 in the glass container 100 that is used to determine that is used to determine the local curvature of function f(x) as well as the glass thickness l(x) within the range from $P_1$ to $P_2$ by means of the approach that is shown in FIGS. 4A and 4B. Plane 111 corresponds to the plane that is centrically located in the glass container and that comprises the longitudinal axis $L_{tube}$ (see FIG. 2) of the glass container (indicated by the dashed line in FIG. 5A), i.e. the axis that goes perpendicular through the centre of the bottom 109 (see FIG. 5B).

Figure 6:
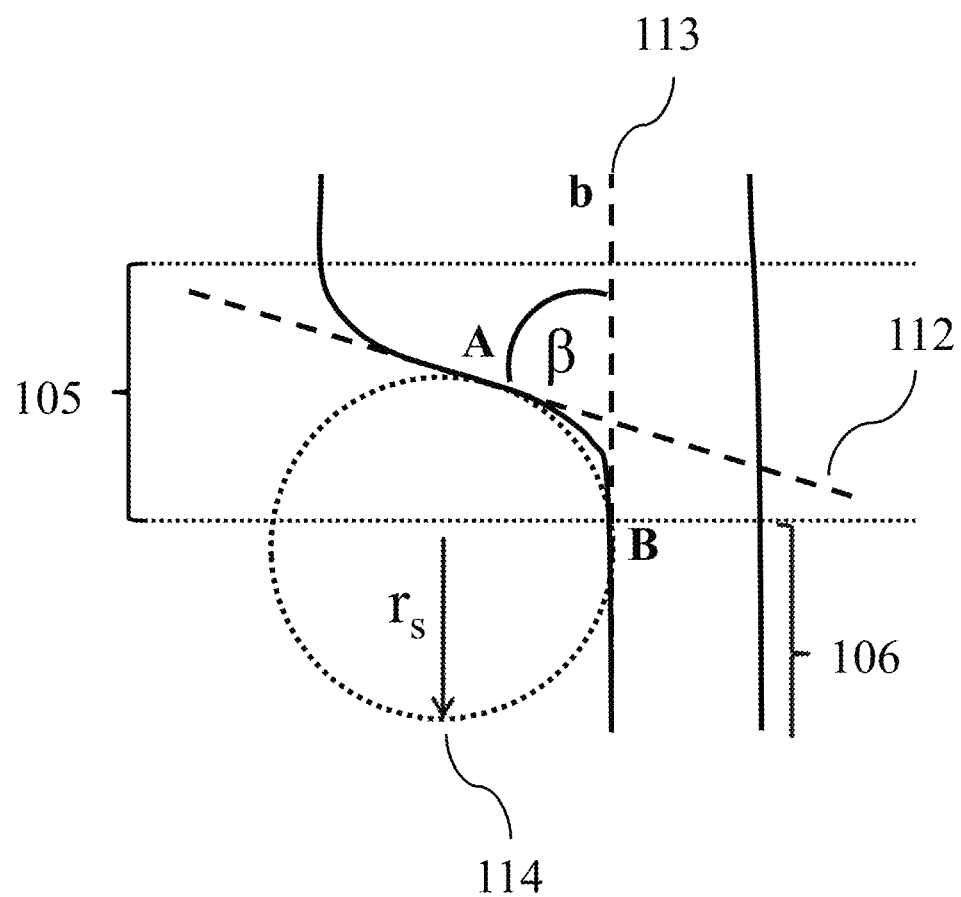
FIG. 6 shows the determination of $r_s$.

FIG. 6 shows the determination of $r_s$. For the determination of the outer radius $r_s$ of the substantially circular arc-shaped area at the end of the junction region 105 that merges into the neck region 106 in images of planes 111 obtained by means of the two approaches described herein in the section "Test methods" point A on the outer surface of the junction region 105 is determined at which the slope β of the tangent 112 reaches its maximum value. In case of a linear section in which the slope β of the tangent 112 reaches a maximum value, A is defined at the point which is nearest to the neck region 106. In s second step, line b 113 is defined as the extension of the essentially non-curved outer surface of the neck region 106. Now the largest possible circle 114 is formed, which is adjacent at point A and coincides at gradient (=bevel circle) and which only touches line b 113 (at point B), but does not cross it (see again FIG. 6). The radius of that circle corresponds to $r_s$.

Figure 7:
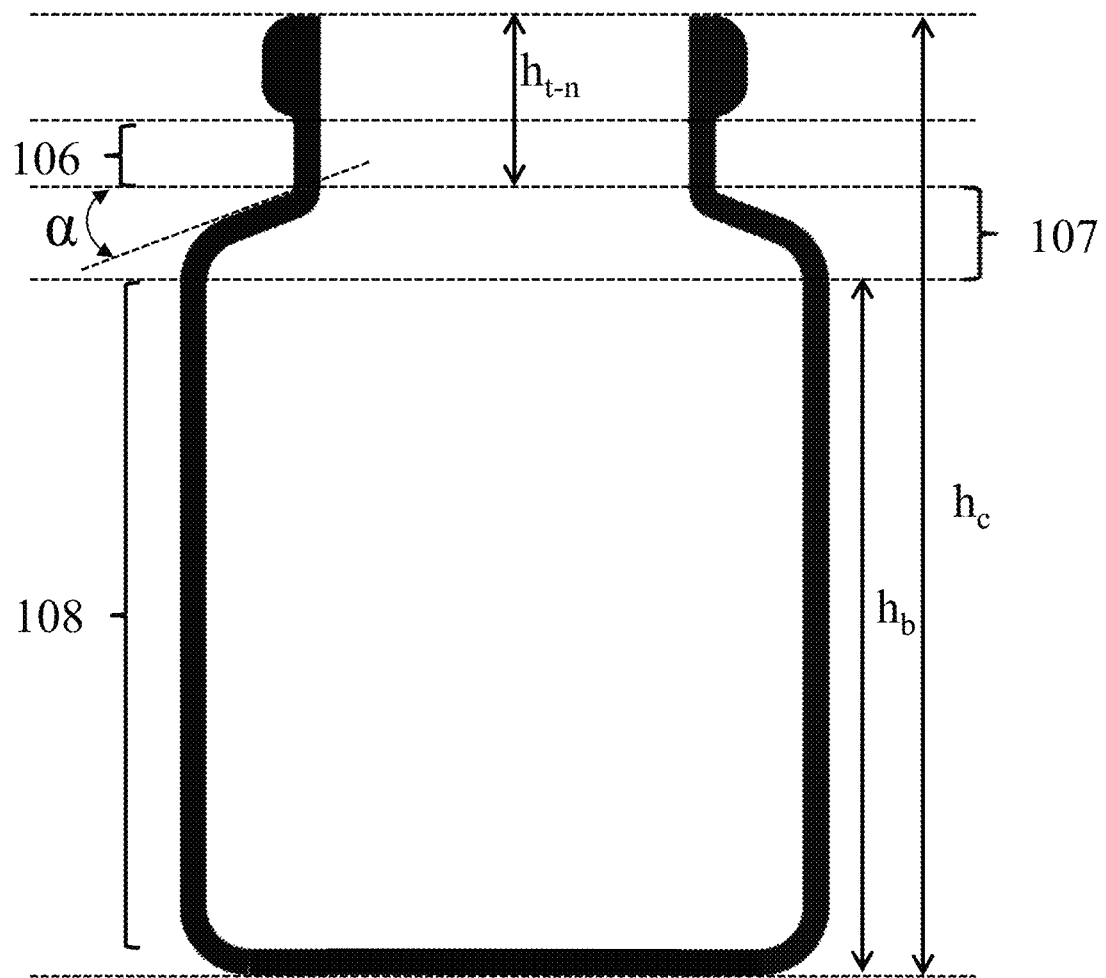
FIG. 7 is further a cross-sectional view of a glass container 100 according to the invention showing a shoulder angle α.

FIG. 7 shows a cross sectional view of a further glass container 100 according to the invention having a height $h_c$. $h_c$ corresponds to the length of the body region 108 and $h_{t-n}$ the total length of the top region 104, the junction region 105 and the neck region 106. The glass container 100 comprises a shoulder region 107 that connects the body region 108 with the neck region 106, wherein shoulder region 107 is characterized by a shoulder angle α.

Figure 8:
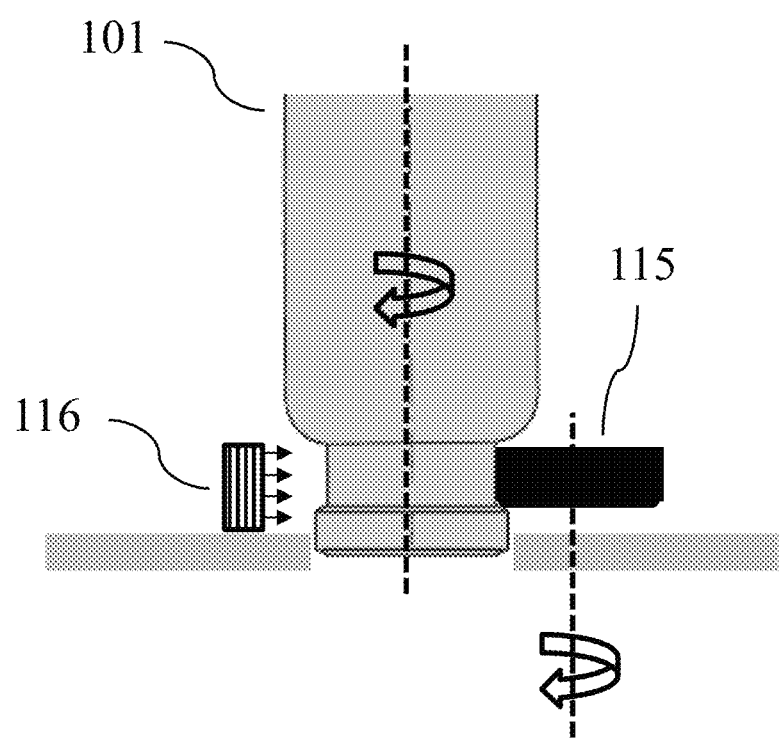
FIG. 8 illustrates the process 1 according to the invention for the preparation of a glass container.

FIG. 8 shows a process for the formation of a top region 104, a junction region 105, a neck region 106 and a shoulder region 107 in a container 100 according to the present invention. A glass tube 101 having an outer diameter $d_b$ of 16 mm and a glass thickness (wall thickness) $l_b$ of 1 mm made of borosilicate glass is loaded into the head of a rotary machine. While rotating around its major axis the glass tube 101 is heated at the bottom end to its softening point with flames 116 and the heated end is shaped to form the top region 104, the junction region 105, the neck region 106 and the shoulder region 107. For the formation of the desired shape of these regions in the rotary machine the glass tube 101 is brought in an upward position as indicated in FIG. 8. By using molding rollers 115 having the desired outer shape to ensure that the required maximum curvature is always realized in the transition area between the top region 104 and the neck region 106 the outer contour $c_{outer}$ in the top region 104, the junction region 105, the neck region 106 and the shoulder region 107 is formed.

Figure 9:
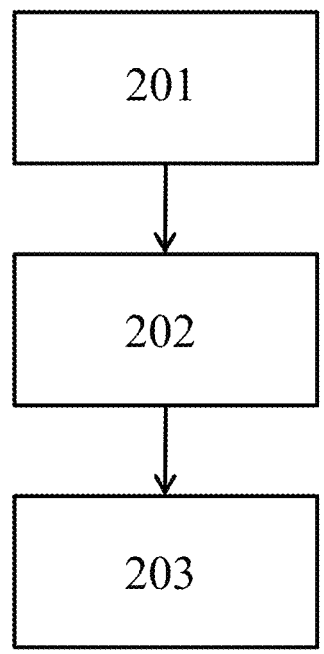
FIG. 9 shows a flow chart of process 2 according to the invention for packaging a pharmaceutical composition.

FIG. 9 shows a flow chart of a process 200 according to the invention for packaging a pharmaceutical composition. In a process step a) 201, a glass container 100 according to the invention is provided. In a process step b) 202, a pharmaceutical composition is filled into the interior volume $V_i$ of the glass container 100, and in a process step c) 203 the opening 112 of the glass container 100 is closed, thereby obtaining a closed glass container 121.

Figure 10:
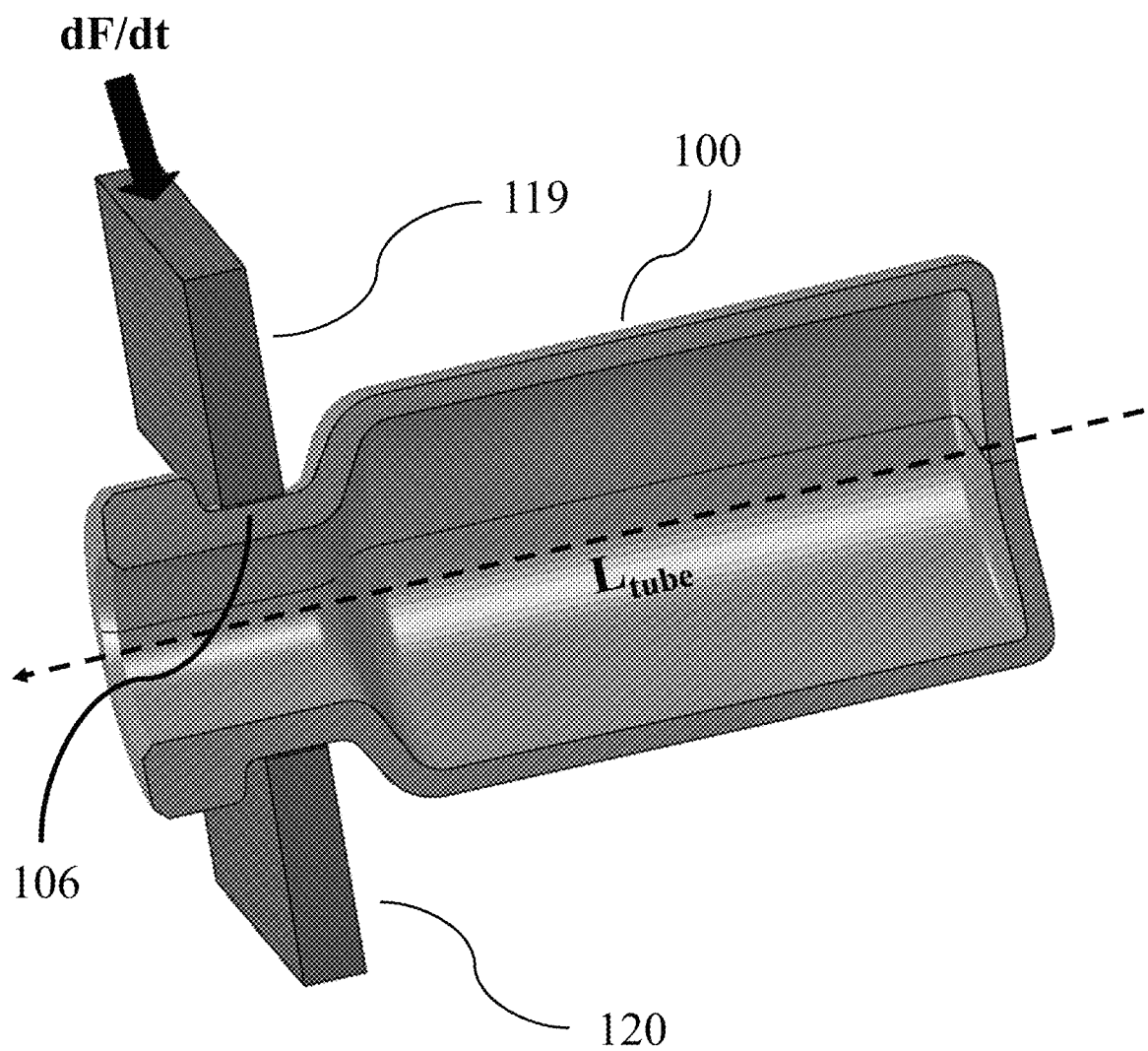
FIG. 10 shows the set-up of the neck squeeze test.

FIG. 10 shows the test to determine the mechanical resistance of the vial neck region 106 against diametral compression. The resistance is determined by means of a diametral load strength testing adapted from DIN EN ISO 8113 ("Glass containers—Resistance to vertical load—Test methods"), where a compressive force is applied in diametral (radial) direction at two opposing positions of the outer surface of the neck region 106. The compressive force is increased at a constant load rate of 2000 N/min until breakage of the vial 100 using a universal testing machine (breakage can be detected as a sudden drop in the force-time diagram F(t)). The diametral load is applied by two opposing, uniaxial concave steel plates 119,120 between which the neck region 106 of the vial 100 is placed parallel to the axis $L_{tube}$ One of the concave steel plates 119 is constructed to be self-adjusting to be able to compensate geometrical irregularities. The radius of the concavity of the two steel surfaces is 25% larger than the radius of the outer diameter d of the neck region 106, so that the load is applied along two opposing lines. The width of the concave steel surfaces is chosen to be slightly shorter than the height of the vial neck region 104.

Figure 11A:
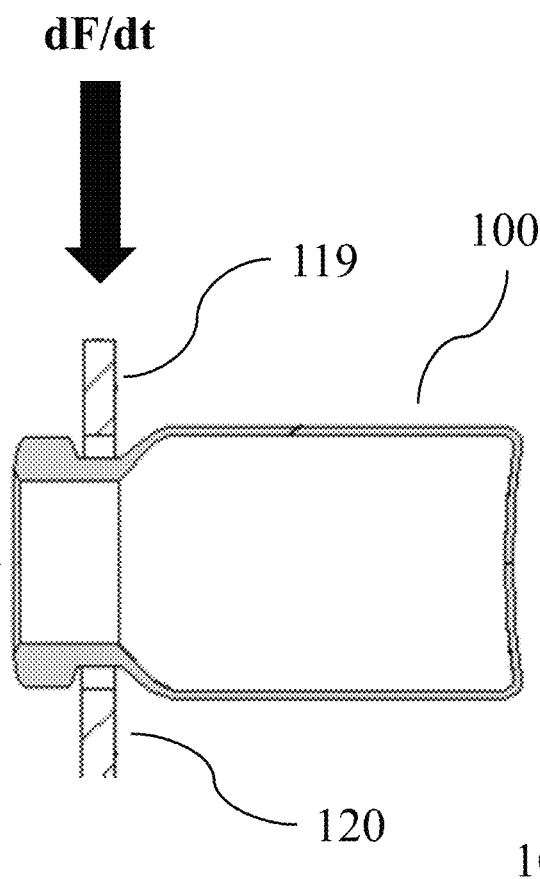
FIG. 11A is a schematic side view of the neck squeeze test.
Figure 11B:
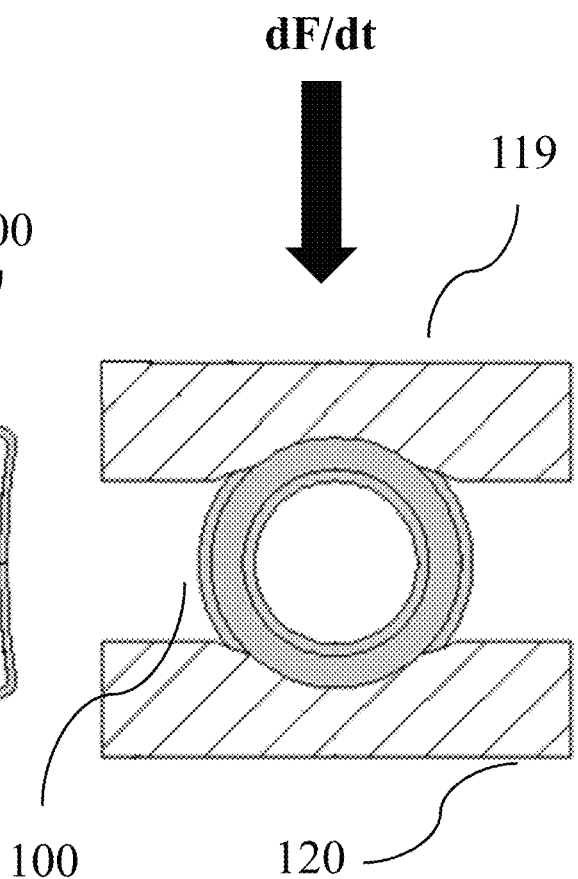
FIG. 11B is a schematic front view of the neck squeeze test.

FIGS. 11A and 11B show a schematic side and front views of the neck squeeze test.

LIST OF REFERENCE NUMERALS 100 glass container according to the invention
101 glass tube 102 first end of the glass tube 101
103 further end of the glass tube 101
104 top region
105 junction region
106 neck region
107 shoulder region
108 body region
109 glass bottom
110 planar and horizontal substrate
111 cross-sectional plane in the middle of the glass container 100
112 tangent with maximum slope β
113 extension of the essentially non-curved outer surface of the neck region 105 (line b)
114 largest possible circle
115 molding roller
116 heating element, preferably a flame
117 self-adjusting steel plate
118 rigid steel plate
119 self-adjusting steel plate
120 rigid steel plate
200 process according to the invention for packaging a pharmaceutical composition
201 process step a)
202 process step b)
203 process step c)

What is claimed is:

1. A glass container, comprising:
a glass tube made of a glass, the glass tube having a first end, a second end, and a longitudinal axis $L_{tube}$ therebetween, the glass tube has, in a direction from the first end to the second end, a top region, a junction region, a neck region, a shoulder region, and a body region, wherein the top region is at the first end and has an outer diameter ($d_t$), the neck region has an outer diameter ($d_n$) with $d_n < d_t$ and the glass in the neck region has a minimum thickness ($l_n$), and the body region extends to the second end, wherein the body region has a glass thickness ($l_b$) and an outer diameter ($d_b$) with $d_b > d_t$; and
a glass bottom closing the glass tube at the second end; and
an interior volume between 1 ml and 150 ml,
wherein the junction region has an outer surface and a substantially circular arc-shaped area, the substantially circular arc-shaped area being where the junction region merges into the neck region, the substantially circular arc-shaped area having an outer radius ($r_s$),
wherein $2 \times [l_n/l_b] \times r_s \geq 2.17$ mm,
wherein the neck region has a mechanical resistance against diametral compression according to a neck squeeze test of at least 1100 N, and
wherein the mechanical resistance against diametral compression is determined by a diametral load strength testing adapted from DIN EN ISO 8113 where a compressive force is applied in diametral direction at two opposing positions of an outer surface of the neck region using two opposing, uniaxial concave steel surfaces having a radius of the concavity that is 25% larger than a radius of the outer diameter of the neck region so that the compressive force is applied along two opposing lines, wherein the concave steel surfaces have a width that is shorter than a height of the neck region, and wherein the compressive force is increased at a constant load rate of 2000 N/min until breakage using a universal testing is detected as a sudden drop in the force-time diagram F(t),
wherein the glass is selected from the group consisting of a borosilicate glass, an aluminosilicate glass, a soda lime glass, and a fused silica; or a combination of at least two thereof,
wherein $r_s$ is in the range from 0.5 to 1.0 mm, and $l_b$ is in range of from 0.4 to 2.5 mm.

2. The glass container of claim 1, wherein, when an outer surface of the body region is placed on a plane horizontal substrate, within any given cross-section of the glass container that is located in a plane centrically located in the glass container and comprising the longitudinal axis $L_{tube}$, f(x) defines a vertical distance between the plane horizontal substrate and the outer surface of the junction region at a given position x and l(x) defines a thickness of the glass tube at the given position x, wherein the thickness of the glass tube l(x) is measured in a direction perpendicular to the longitudinal axis $L_{tube}$,
wherein $k(x) = |f''(x)/[1+f'(x)^2]^{3/2}|$ defines an absolute value of a curvature of f(x) at the given position x; and
wherein, in an interval defined at the junction region between $x = P_1$ and $x = P_2$ for any concave curvature in the interval, a minimum value for $[l(x)/l_b]^3/k(x)$ is at least 0.35 mm, wherein $P_2$ defines the x-position at which f(x) is $\frac{1}{2} \times d_b - \frac{1}{4} \times d_t - \frac{1}{4} \times d_n$ and $P_1$ is $P_2 - d_t/2 + d_n/2$.

3. The glass container of claim 1, wherein the glass container is a vial with the interior volume of 1 to 8 ml, $d_n \geq 9.7$ ml.

4. The glass container of claim 3, wherein the vial has a size designation "2R" or "4R" according to DIN EN ISO 8362-1:2016-06.

5. The glass container of claim 1, wherein the glass container is a vial with the interior volume of 8.5 to 22 ml, $d_n \geq 15.5$ ml.

6. The glass container of claim 5, wherein the vial has a size designation "6R", "8R" or "10R" according to DIN EN ISO 8362-1:2016-06.

7. The glass container of claim 1, wherein the glass container is a vial with the interior volume of 22.5 to 150 ml, $d_n \geq 16.5$ ml.

8. The glass container of claim 7, wherein the vial has a size designation "20R", "25R", "30R", "50R" or "100R" according to DIN EN ISO 8362-1:2016-06.

9. The glass container of claim 1, wherein $l_1/l_b \geq 1.4$.

10. The glass container of claim 1, wherein $l_n \times r_s/l_b \geq 0.7$ mm.

11. The glass container of claim 1, further comprising a pharmaceutical composition in the interior volume and a closure closing the glass tube at the first end.

12. The glass container of claim 1, wherein the glass thickness ($l_b$) throughout the body region is in a range from ±0.2 mm based on a mean value of the glass thickness in the body region.

13. The glass container of claim 1, wherein the glass container has a mass of glass mg and the interior volume $V_i$, wherein $m_g/V_i^{0.75} < 2.0$.

14. The glass container of claim 1, further comprising a coating that at least partially superimposes the exterior surface, the interior surface or the exterior and the interior surface of the glass tube.

15. The glass container of claim 14, wherein the coating comprises a silicone, a silane or a mixture thereof, wherein the silicone or the silane can be crosslinked or non-crosslinked.

16. The glass container of claim 1, wherein the glass container at least in the neck region is characterized by a substantially homogeneous distribution of sodium across a thickness of the glass at least in the neck region.

17. The glass container of claim 1, wherein the glass container at least in the neck region is characterized by a substantially homogeneous distribution of potassium across a thickness of the glass at least in the neck region.

18. The glass container of claim 1, wherein the glass of the glass container at least in the neck region is characterized by a compressive stress (CS) in an outer surface in the neck region which is lower than 500 MPa.

19. The glass container of claim 1, wherein the body region has a mechanical resistance to a side compression test of 16% greater than a glass container that does not satisfy $2\times[l_n/l_b]\times r_s \geq 0.9$ mm, wherein the mechanical resistance against diametral compression is determined by a diametral load strength testing adapted from DIN EN ISO 8113 where a compressive force is applied in diametral direction at two opposing positions of an outer surface of the body region using two opposing, uniaxial concave steel surfaces having a radius of the concavity that is 25% larger than a radius of the outer diameter of the body region so that the compressive force is applied along two opposing lines, wherein the concave steel surfaces have a width that is larger than a height of the body region, and wherein the compressive force is increased at a constant load rate of 1500 N/min until breakage using a universal testing is detected as a sudden drop in the force-time diagram F(t).

20. The glass container of claim 1, wherein the following conditions are fulfilled:
   $2\times[l_n/l_b]\times r_s \geq 1.5$ mm;
   the vial has a size designation according to DIN EN ISO 8362-1:2016-06 selected from a group consisting of "2R", "4R", "6R", "8R", and "10R";
   $l_b$ is in a range from 0.8 to 1.3 mm; and
   $r_s$ is in a range from 0.6 to 0.95 mm.

21. A glass container, comprising:
   a glass tube having a first end, a second end, and a longitudinal axis $L_{tube}$ therebetween, the glass tube having, in a direction from the first end to the second end, a top region, a junction region, a neck region, a shoulder region, and a body region;
   a bottom closing the glass tube at the second end; and
   an interior volume between 1 ml and 150 ml,
   wherein the top region is at the first end and has an outer diameter ($d_t$),
   wherein the neck region has an outer diameter ($d_n$) with $d_n < d_t$ and a minimum thickness ($l_n$),
   wherein the body region extends to the second end and has a glass thickness ($l_b$) and an outer diameter ($d_b$) with $d_b > d_t$,
   wherein the junction region has an outer surface and a substantially circular arc-shaped area, the substantially circular arc-shaped area being where the junction region merges into the neck region, the substantially circular arc-shaped area having an outer radius ($r_s$),
   wherein $2\times[l_n/l_b]\times r_s \geq 2.17$ mm,
   wherein the body region has a mechanical resistance to a side compression test of 16% greater than a glass container that does not satisfy $2\times[l_n/l_b]\times r_s \geq 0.9$ mm, and
   wherein the mechanical resistance against diametral compression is determined by a diametral load strength testing adapted from DIN EN ISO 8113 where a compressive force is applied in diametral direction at two opposing positions of an outer surface of the body region using two opposing, uniaxial concave steel surfaces having a radius of the concavity that is 25% larger than a radius of the outer diameter of the body region so that the compressive force is applied along two opposing lines, wherein the concave steel surfaces have a width that is larger than a height of the body region, and wherein the compressive force is increased at a constant load rate of 1500 N/min until breakage using a universal testing is detected as a sudden drop in the force-time diagram F(t),
   wherein the glass is selected from the group consisting of a borosilicate glass, an aluminosilicate glass, a soda lime glass, and a fused silica; or a combination of at least two thereof,
   wherein $r_s$ is in the range from 0.5 to 1.0 mm, and $l_b$ is in range of from 0.4 to 2.5 mm.

22. The glass container of claim 21, wherein the neck region has a mechanical resistance against diametral compression according to a neck squeeze test of at least 1100 N, wherein the mechanical resistance against diametral compression is determined by a diametral load strength testing adapted from DIN EN ISO 8113 where a compressive force is applied in diametral direction at two opposing positions of an outer surface of the neck region using two opposing, uniaxial concave steel surfaces having a radius of the concavity that is 25% larger than a radius of the outer diameter of the neck region so that the compressive force is applied along two opposing lines, wherein the concave steel surfaces have a width that is shorter than a height of the neck region, and wherein the compressive force is increased at a constant load rate of 2000 N/min until breakage using a universal testing is detected as a sudden drop in the force-time diagram F(t).

* * * * *